United States Patent
Petty et al.

(10) Patent No.: US 10,154,180 B2
(45) Date of Patent: Dec. 11, 2018

(54) CAMERA HAVING A SEPARATE IMAGE CAPTURE MODULE AND A METHOD OF ASSEMBLING THE CAMERA

(71) Applicant: Blackmagic Design Pty Ltd, Port Melbourne, Victoria (AU)

(72) Inventors: Grant Petty, Port Melbourne (AU); Simon Kidd, Port Melbourne (AU); Michael Cornish, Port Melbourne (AU); Stuart Elford, Port Melbourne (AU); David Lunn, Port Melbourne (AU); John Vanzella, Port Melbourne (AU); Carsten Buettner, Port Melbourne (AU); Patrick Tolcher, Port Melbourne (AU)

(73) Assignee: BLACKMAGIC DESIGN PTY LTD., Port Melbourne (AU)

(*) Notice: Subject to any disclaimer, the term of this patent is extended or adjusted under 35 U.S.C. 154(b) by 0 days.

(21) Appl. No.: 15/490,214

(22) Filed: Apr. 18, 2017

(65) Prior Publication Data
US 2017/0223239 A1 Aug. 3, 2017

Related U.S. Application Data

(63) Continuation of application No. 14/391,982, filed as application No. PCT/AU2013/000381 on Apr. 12, 2013, now Pat. No. 9,661,235.

(51) Int. Cl.
*H04N 5/225* (2006.01)
*G03B 17/14* (2006.01)
(Continued)

(52) U.S. Cl.
CPC ........... *H04N 5/2252* (2013.01); *G03B 17/14* (2013.01); *G03B 17/55* (2013.01); *G03B 17/561* (2013.01);
(Continued)

(58) Field of Classification Search
CPC .... G03B 17/14; H04N 5/2251; H04N 5/2257; H04N 5/23293; H04N 5/238
See application file for complete search history.

(56) References Cited

U.S. PATENT DOCUMENTS 5,839,284 A * 11/1998 Wyatt ................. G01J 5/02
62/3.2
7,583,314 B2 9/2009 Kajihara et al.
(Continued)

FOREIGN PATENT DOCUMENTS

CN 1774042 A 5/2006
CN 101685242 A 3/2010
(Continued)

OTHER PUBLICATIONS

Office Action for Chinese Application No. 201380031174.8, dated Oct. 11, 2017, 11 pgs.
(Continued)

*Primary Examiner* — Amy Hsu
(74) *Attorney, Agent, or Firm* — Haynes and Boone, LLP

(57) ABSTRACT

A camera including an image capture module, and at least one other module. The image capture module is a sealed module and includes: a housing; at least one image sensor to convert light into electrical signals; an optical system associated with the image sensor and arranged to transmit light through the housing to the at least one image sensor; the image capture module and the at least one other module being directly or indirectly mounted to each other, and interoperable with each other to capture images. An image capture module and method of construction of a camera are also described.

22 Claims, 13 Drawing Sheets

(51) Int. Cl.
   *H04N 5/232* (2006.01)
   *H04N 5/238* (2006.01)
   *G03B 17/55* (2006.01)
   *G03B 17/56* (2006.01)
(52) U.S. Cl.
   CPC ......... *H04N 5/2251* (2013.01); *H04N 5/2253* (2013.01); *H04N 5/2254* (2013.01); *H04N 5/2257* (2013.01); *H04N 5/238* (2013.01); *H04N 5/23216* (2013.01); *H04N 5/23293* (2013.01)

(56) References Cited

U.S. PATENT DOCUMENTS

| | | | |
|---|---|---|---|
| 7,839,450 B2* | 11/2010 | Hing | G01J 3/02 348/373 |
| 7,933,515 B2 | 4/2011 | Iyoda et al. | |
| 8,194,136 B1* | 6/2012 | Askey | G01M 11/0264 348/175 |
| 8,907,800 B2* | 12/2014 | Namekawa | G01K 7/42 340/588 |
| 2003/0202106 A1* | 10/2003 | Kandleinsberger | H04N 5/23293 348/207.99 |
| 2004/0169771 A1* | 9/2004 | Washington | H04N 5/2251 348/374 |
| 2005/0024529 A1* | 2/2005 | Kurosawa | G03B 5/08 348/375 |
| 2005/0134727 A1* | 6/2005 | Teramoto | H04N 5/2251 348/375 |
| 2005/0211888 A1* | 9/2005 | Sato | H01L 27/14618 250/239 |
| 2005/0242274 A1* | 11/2005 | Webster | G02B 7/02 250/239 |
| 2006/0056049 A1 | 3/2006 | Tokiwa et al. | |
| 2006/0291853 A1* | 12/2006 | Lee | G02B 7/021 396/529 |
| 2007/0140686 A1 | 6/2007 | Misawa | |
| 2009/0160998 A1* | 6/2009 | Fukamachi | G02B 7/021 348/340 |
| 2010/0194974 A1 | 8/2010 | Hosihikawa | |
| 2010/0200729 A1* | 8/2010 | Lee | H04N 5/37457 250/208.1 |
| 2010/0261961 A1 | 10/2010 | Scott et al. | |
| 2012/0013729 A1 | 1/2012 | Barringer | |
| 2012/0169920 A1* | 7/2012 | Mukai | H04N 5/2253 348/373 |
| 2012/0314119 A1* | 12/2012 | Tobinaga | H04N 5/2253 348/335 |
| 2012/0315952 A1* | 12/2012 | Du | H04N 5/2251 455/556.1 |

FOREIGN PATENT DOCUMENTS

| | | |
|---|---|---|
| CN | 102192795 A | 9/2011 |
| CN | 202103756 U | 1/2012 |
| CN | 202135216 U | 2/2012 |
| JP | H08172561 | 7/1996 |

OTHER PUBLICATIONS

International Application No. PCT/AU2013/000381, Search Report and Written Opinion dated Jun. 24, 2013, 10 pgs.
European Application No. 13775089.9, Search Report dated Jan. 16, 2016, 7 pgs.
European Office Action for Application No. 13775089.9, dated Jan. 29, 2018, 4 pgs.

* cited by examiner

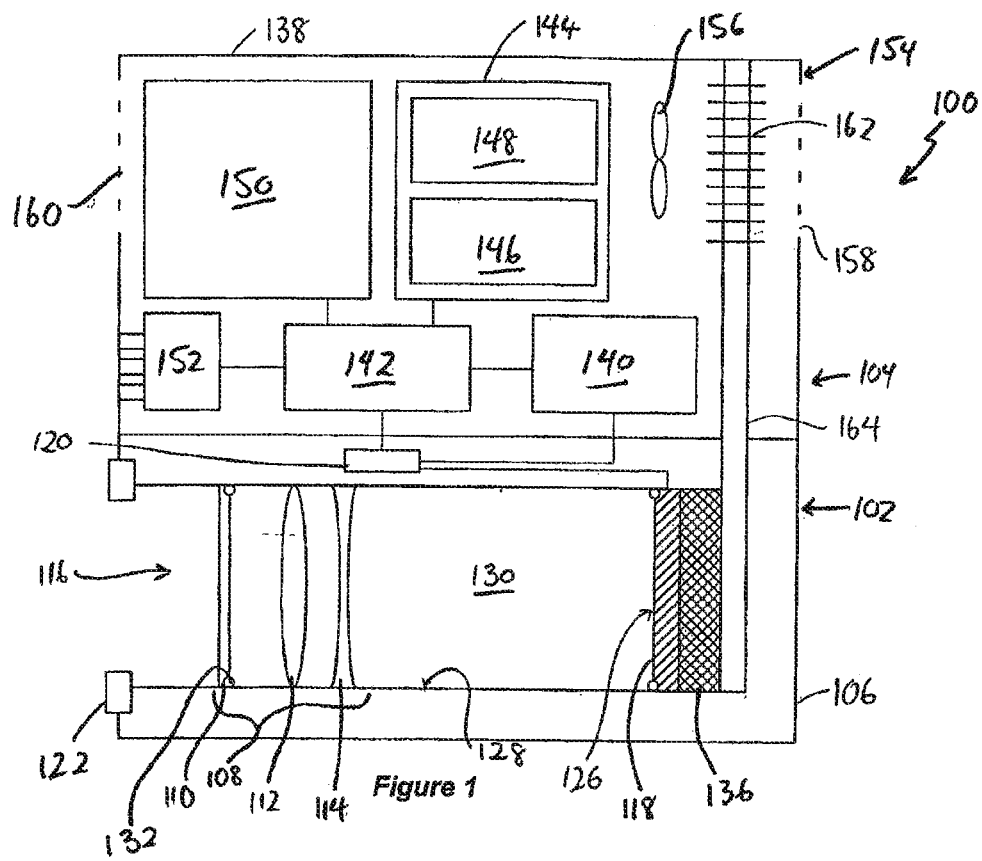
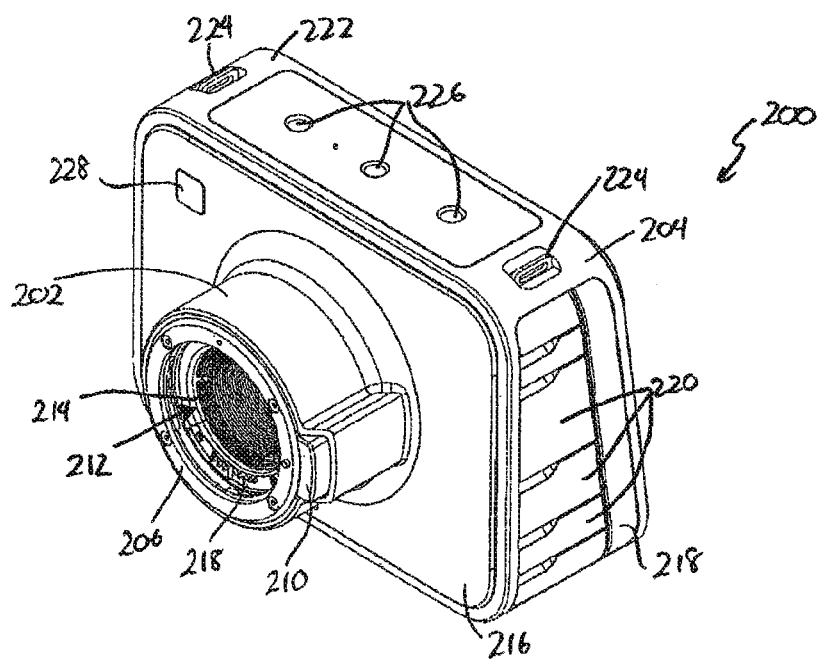
Figure 2A

CAMERA HAVING A SEPARATE IMAGE CAPTURE MODULE AND A METHOD OF ASSEMBLING THE CAMERA

CROSS REFERENCE TO RELATED APPLICATIONS

This application is a continuation of U.S. patent application Ser. No. 14/391,982, filed Oct. 10, 2014 which is a U.S. national phase of co-pending international patent application No. PCT/AU2013/000381, filed Apr. 12, 2013, which claims priority to Australian application No. AU2012901461, filed Apr. 13, 2012, the disclosures of which are incorporated herein by reference.

FIELD OF THE INVENTION

The present invention relates to cameras and their construction. The present invention is described in connection with the construction of a video camera, but may additionally find application in manufacture of digital still cameras.

BACKGROUND OF THE INVENTION

Manufacture of a camera is a complex process which presents particular challenges. Some of these include:

The need to maintain sensor cleanliness often results in the need to build the entire product in a clean room. With parts for the body of the camera coming from a number of different sources, the body parts of the camera are often not clean enough to enter a clean room where the sensor is to be assembled. Presently the only solution to this is that all components are manufactured to a cleanliness standard that is often expensive, or unattainable.

Assembling the product to tight tolerances can be very difficult, because the combination of multiple mechanical parts, each with their own manufacturing tolerance, increases tolerance stack-up, This can make it difficult to calibrate the sensor position relative to the lens mount. The process of calibrating such a complex device itself can be difficult and time consuming. Moreover many of the steps are mechanical in nature and must be repeated. This can create a bottle neck in the assembly process.

Some of the manufacturing and calibration issues can be addressed by the use of jigs to assist in certain manufacturing steps, say to ensure the sensor is aligned to its substrate before assembly and then glued in place. However such jigs only complete half the job of alignment, the sensor still requires physical alignment to the body of the camera to ensure it aligns with the lenses, this is a long arduous process that can add substantial assembly time. US 2004/0121503 described a system of this type.

These difficulties have flow on effects. For example to create an alternate version of the product to support a different lens systems etc., often requires a complete product and production system redesign.

Highly skilled technicians are also required for the assembly of the whole product, which increases cost.

Manufacturing mistakes that affect the product as it nears completion can require complete disassembly of the whole product to solve.

Moreover the inherent complexity of the device makes servicing difficult. For example, currently to service a sensor assembly of a camera, the whole camera must disassembled. Disassembling of the camera can lead to contamination of the sensor so must be performed under very controlled circumstances. In the ideal situation, this would be a clean-room. Although in most cases a camera that has been used in the field could not be made clean enough to be worked on in a clean room, so this is not practical.

Accordingly there is a need for a camera design that addresses at least one of the foregoing drawbacks of the prior art or at least provides a useful alternative to the conventional approach to camera construction.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

In broad concept a camera made in accordance with an embodiment of the present invention includes a plurality of modules each having a separate housing. The modules are coupled together and at least one of data, electrical or thermal connection is made between neighboring modules to complete the camera. At least one of the modules is an image capture module that includes an image sensor and optical system mounted to its housing, and forming a sealed unit. The other module(s) can include a main body unit which includes components for providing other functions to the completed camera, such as data processing, power delivery, data storage, thermal control and/or user interface functions.

Advantageously the image capture module is able to be assembled separately to the other module(s) of the camera. The modules can be connected together to complete construction of the camera body. Most preferably the image capture module is integrated in the camera during assembly of the other modules and provides at least part of the camera housing.

This modular construction can allow each module to be manufactured under different manufacturing conditions if needed. Advantageously, the image capture module can be manufactured in relatively better conditions (e.g. cleaner, low static, higher precision) than the other module(s). For example the image capture module can be assembled in a clean room environment, whereas the main body module can be assembled in a routine electronics assembly environment. Because the image capture module is a sealed unit it can be assembled to the main body module (or other module) at final assembly outside the clean room environment. Accordingly in one form there is described a camera including an image capture module, and at least one other module; said image capture module being a sealed module and including: a housing; at least one image sensor to convert light into electrical signals; an optical system associated with the image sensor and arranged to transmit light through the housing to the at least one image sensor; said image capture module and said at least one other module being directly or indirectly mounted to each other, and interoperable with each other to capture images.

In a first aspect of the present invention there is provided a camera including a body module including: a body housing and an image capture module. The image capture module being a sealed module and including:

a housing;

at least one image sensor to convert light into electrical signals;

an optical system associated with the image sensor and arranged to transmit light through the housing to the at least one image sensor;

a lens mount including a coupling to releasably engage a lens or other optical module to connect the lens or other optical module to the image capture module;

said image capture module being mounted directly or indirectly to the body housing, and interoperable with the body module to capture images.

Preferably the image capture module includes a thermal interface arranged to enable thermal connection between the image capture module and the body module.

In a preferred form said at least one other module has a housing to which is mounted any one or more of:

a power supply subsystem arranged to supply power to the image capture module;

data processing system(s) to process image data received from an image sensor of the image capture module;

a thermal control subsystem arranged to dissipate heat generated in the image capture module;

a user interface subsystem to enable user control of the image capture module;

a data storage subsystem to store data derived from an image sensor of the image capture module;

an input and or output subsystem to enable data or electrical connection to another device.

In a preferred form the camera includes an electrical connection between the image capture module and another module to deliver electrical power to the image capture module.

In a preferred form the camera includes a data communication connection between the image capture module and another module to exchange data between the image capture module and the other module. Said data could be, without limitation, image data received from an image sensor of the image capture module; control data for controlling the operation of the image capture module or an optical module or lens connected, thereto; sensing data derived from sensors mounted in the image capture module, or an optical module or lens connected thereto.

In a preferred form the camera includes a thermal connection between the image capture module and another module to transmit heat generated in the image capture module for dissipation from the other module. The thermal connection preferably includes at least one heat-transfer element to draw heat away from the image capture module. The heat transfer element could include one or more of a Peltier cooler (or other active cooler) or heat pipe or the like.

The image capture module preferably includes a lens mount on one end thereof, said lens mount including a coupling to releasably engage a lens or other optical module thereto. The lens mount can have a mounting face against which a mating surface of a lens abuts.

The image capture module can include at least one image sensor, each having an. imaging plane. The image sensor(s) is(are) preferably mounted within the image capture module such that the imaging plane lies at a predefined distance from a plane of the mounting face of the lens mount, The predefined distance corresponds to the type of lens mount.

The image sensor is mounted to the housing of the image capture module via an adjustable mounting structure. The adjustable mounting structure allows adjustment of the position of the image sensor position with respect to the housing and lens mount.

Preferably the at least one image sensor is mounted on a substrate. The adjustable mounting structure can include a series of adjustment screws holding the substrate to the housing. Said adjustable mounting means optionally including one or more spacers positioned between the substrate and housing to set the predefined distance between the imaging plane and the plane of the mounting face of the lens mount.

The optical system of the image capture module includes one or more light transmissive elements in front of and covering the image sensor. The one or more light transmissive elements could be any type of light transmissive element including but are not limited to:

one or more lenses;
one or more filters;
one or more polarisers;
a light transmissive cover.

Preferably, the optical element covering the image sensor is spaced apart from the image sensor and sealed to the housing.

The image capture module can additionally include a rear seal sealing at least one or the substrate and/or image sensor to the housing.

In this case, the optical element covering the image sensor, at least the imaging plane of the image sensor and an inside wall of the housing there between define the sealed volume within the image capture module.

The camera can additionally include a cooling system arranged to cool the image sensor. Preferably the cooling system is part of the image capture module, although it may be part of another module or form a connection between modules. The cooling system can be an active cooling system. In one form the active cooling can include a Peltier cooler mounted to the image capture module in thermal contact with the image sensor arranged to transfer heat away from the image sensor. The thermal contact can be direct or indirect. The cooling system may form at least part of the thermal connection between the image capture module and the other module.

The image capture module preferably can include a generally tubular body in which components are mounted. For example, the lens mount is preferably mounted at one end and the substrate carrying the image sensor on or adjacent to the other end thereof. In a preferred form, the body housing is metal, and most preferably aluminium, although other metallic and non-metallic materials can be used. Most preferably the metal housing is of unitary construction and machined from a single block of material.

The metal housing is preferably thermally connected to the image capture module, either directly or via a heat transmitter (e.g. a heat pipe or the like) such that heat generated in the image capture module is transmitted to the metal housing for dissipation.

As will be appreciated, direct contact in the context of heat transmission can include contact via an intermediate substance or material that aids thermal transmission between components, such as thermal grease or the like.

The thermal control subsystem arranged to dissipate heat generated in the image capture module and the other module preferably includes a fan and ventilation openings to move air through the housing of the other module.

The user interface subsystem preferably includes a touchscreen and/or buttons.

The data storage subsystem to store at least data derived from an image sensor of image capture module can include a removable memory module. Preferably the removable memory module is a solid state drive.

In a particularly preferred form the housing of the image capture module forms part of the external housing of the camera.

The camera of some embodiments can include one or more second image capture modules. Such an arrangement can facilitate capturing images from more than one viewpoint, as will be done to create 3 dimensional video images. Preferably the image capture module and the one or more second image capture module(s) are substantially the same. Said image capture module and the second image capture module(s) can be mounted relative to each other in a predetermined position and orientation. Alternatively they can be mounted in such a way that the predetermined relative position and or orientation can be adjusted to suit image capture requirements.

The present invention also provides a method of assembling a camera, which includes separately assembling an image capture module, and assembling the rest of the camera including the pre-assembled image capture module. The image capture module preferably includes part of the structural housing of the assembled camera.

The assembly process preferably includes mechanically mounting the pre-assembled image capture module to a main housing of the camera. The method preferably includes making at least one of the following connections between the image capture module and another module of the camera;
 data connection;
 electrical power connection;
 thermal connection.

The process of assembling the rest of the camera including the pre-assembled image capture module, can include pre-assembling another module and then assembling the modules to form the camera; or integrating the pre-assembled image capture module into another module during assembly of the other module.

The method can include making a thermal connection between the image capture module at least one other component of the camera for dissipation of heat generated by the image capture module. Preferably the thermal connection is made between at least one image sensor of the image capture module and a housing of the camera.

The method can include calibrating a positioning of an imaging plane of at least one image sensor of the image capture module at a predetermined position with respect to a mounting plane of a lens mount prior to assembling the rest of the camera including the image capture module. In the case that the at least one image sensor is mounted to the image capture module via an adjustable mounting structure to allow adjustment of the position of the at least one image sensor position with respect to lens mount and the method can further includes fixing the position of the adjustable mounting structure to attain the predetermined position. The method can additionally or alternatively include inserting a one or more spacers to set the predetermined position of the at least one image sensor.

One or more second image capture modules can be pre-assembled and/or mounted to another module (including the image capture module) in the same or a similar manner.

In another aspect the present invention provides an image capture module for a camera, such as a video camera, said image capture module being a sealed module and including: a housing; at least one image sensor to convert light into electrical signals; a thermal interface configured to allow transmission of heat away from the at least one image sensor.

Most preferably the thermal interface is adapted to be coupled (directly or indirectly) to an element or structure of the camera to transmit heat thereto. The image capture module can include an optical system associated with the image sensor and arranged to transmit light through the housing to the at least one image sensor; a lens mount including a coupling to releasably engage a lens or other optical module to connect the lens or other optical module to the image capture module. The image capture module is preferably arranged to be mounted directly or indirectly to a camera body and interoperable therewith to capture images.

In another aspect there is provided an image capture module, said image capture module being a sealed module and including: a housing; at least one image sensor to convert light into electrical signals; an optical system associated with the image sensor and arranged to transmit light through the housing to the at least one image sensor; a lens mount including a coupling to releasably engage a lens or other optical module to connect the lens or other optical module to the image capture module; said image capture module being adapted to be integrated into a camera to video images to be captured.

In either of the above aspects of the invention, the image capture module may include at least one image sensor wherein each image sensor has an imaging plane, said image sensor being mounted within the image capture module such that the imaging plane lies at a predefined distance from a plane of a mounting face of the lens mount. The at least one image sensor may be mounted to the image capture module via an adjustable mounting structure to allows adjustment of the position of the at least one image sensor position with respect to the housing and lens mount. The at least one image sensor may be mounted on a substrate, wherein the adjustable mounting structure includes a series of adjustment screws holding the substrate to the housing. Said adjustable mounting means may further include one or more spacers positioned between the substrate and housing to set the predefined distance between the imaging plane and the plane of the mounting face of the lens mount. The optical system of the image capture module may include one or more light transmissive elements in front of and covering the at least one image sensor. The light transmissive element covering the image sensor may be spaced apart from the image sensor and sealed to the housing. The image capture module may additionally include a rear seal sealing at least one or the substrate and/or image sensor to the housing. The image capture module can additionally include a cooling system arranged to cool the image sensor and provide a thermal interface with another part of the camera, preferably, the body of the camera or a heat dissipation arrangement mounted therein. The cooling system may be an active cooling system thermally coupled with the image sensor arranged to transfer heat away from the image sensor. The image capture module can include a generally tubular body with said lens mount located at one end thereof and a substrate carrying the image sensor mounted on or adjacent to the other end thereof. The thermal interface of the image capture modules may be connected to the body of the camera or a body module of the camera to transmit heat generated in the image capture module for dissipation by the body or body module.

In another aspect of the present invention there is provided a camera including at least one of said image capture modules As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

Embodiments of the present invention will be described, by way of non limiting example only, with reference to the accompanying drawings. In the drawings:

FIG. 1 is a schematic block diagram illustrating the main functional blocks of a camera made in accordance with an embodiment of the present invention;

FIG. 2A is a perspective view of the front of a camera made in accordance with an embodiment of the present invention;

DETAILED DESCRIPTION OF THE EMBODIMENTS

Figure 2B:
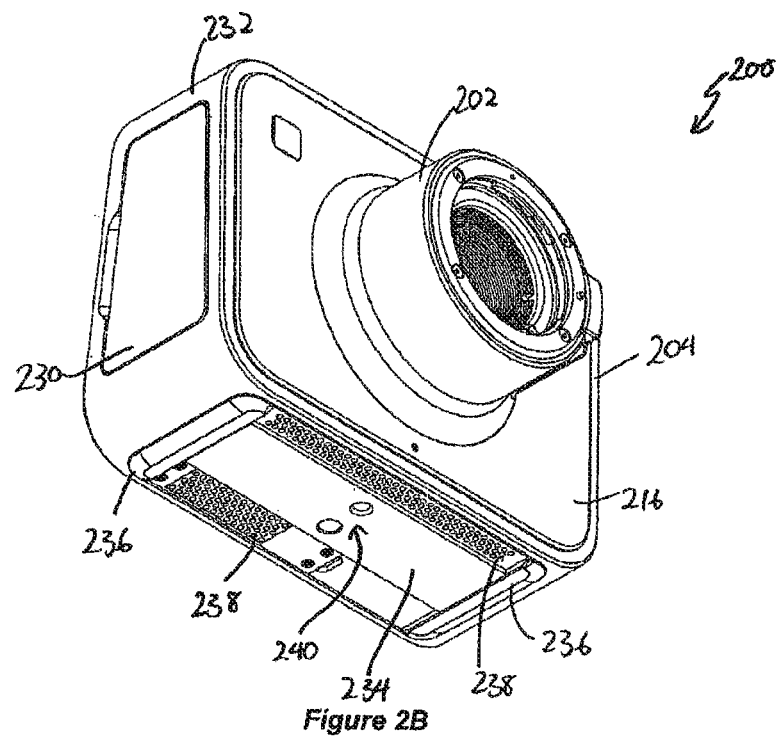
FIG. 2B shows a front, lower, perspective view of the camera of FIG. 2A.

FIG. 1 illustrates a schematic representation of a camera 100. The camera 100 is formed from two primary modules, an image capture module 102 and a body module 104. The image capture module 102 forms a sealed optical and image capture system which is configured to receive light and form an image in an image capture sensor. The body module 104 houses the remaining functional subsystems of the camera 100.

Turning firstly to the image capture module 102, which is formed from an image capture module housing 106 in which is mounted an optical system 108, imaging sensor 118 and supporting electronics systems. The optical system 108 includes a cover lens and optionally one or more focusing lenses 112 and 114. Light enters the camera through an aperture 116 and passes through the optical system 108 and is received at an image sensor 118. The image sensor 118 can include one or more devices which convert received light to electrical signals, for example a charge coupled device (CCD) or complementary metal oxide semiconductor (CMOS) pixel sensor. As will be appreciated a person skilled in the art will be able to choose an image sensor having suitable operational parameters (e.g. sensor size, resolution etc.) to suit requirements.

The image capture module additionally includes on board data storage in the form of memory 120, which stores operational parameters related to the image sensor 118.

In order to facilitate the attachment of other optical systems and lenses, the image capture module 102 additionally includes a lens mount 122. The lens mount 122 is located adjacent to aperture 116, facilitates the attachment of lenses to extend the performance operation of the optical system 108. The lens mount may additionally include electrical contacts (not shown in this view) for providing an electrical or data interface with lenses or systems attached thereto.

The image capture module 102 forms a sealed unit between: the rear face of the outermost element in the optical system 108, which in this case is face 124 of the cover lens 110 and the light receiving face 126 of the image sensor 118. This ensures that the imaging optics 108, and most importantly the sensor 118 is not soiled by dust or other contaminants.

In one example, the inside face 128 of the sealed region 130 can be generally tubular and coated with an antireflective coating so as to minimize stray reflections within the optical system. At a first end thereof, the cover lens 110 is mounted, and sealed against the inside surface 128 of the chamber 130, using an O-ring 132. At the other end of the region 130 is mounted the sensor 118 which is also sealed against the walls of the chamber 130 using a seal 134.

The image capture module 102 additionally includes a cooling system 136 which draws heat away from the imaging sensor 118 in order to maintain correct operation of the sensor. In a preferred form the temperature of the imaging sensor 118 is maintained at a constant level, hence it is preferable to use an active cooler, such as a Peltier cooler that can vary its cooling effectiveness to suit variations in the temperature level of the imaging sensor 118.

In use, the image capture module 102 is mechanically connected to the main body module 104. There are also data, power and thermal connections between the two modules 102 and 104.

The main body module 104 includes a housing 138 in which is mounted a variety of subsystems which interact with each other to perform a majority of functions of the camera 100, as follows.

The module 104 houses a power supply module 140, which will typically be a battery, providing power through a suitable power supply circuit, but may additionally, or alternatively, receive power from an external source, such as an AC power adaptor or external battery or other external power source.

A data processing subsystem 142 is provided for both controlling the operation of the camera generally as well as processing image data received from the image processor 120 of the image capture module 102.

Connected to the data processing system 142 is data storage system 144. The data storage system 144 includes memory 146 which provides working memory to store programs and data for use by the data processing system 142; and also a data storage system 148, for receiving and storing image data captured with the camera, and associated data, e.g. metadata and the like. In some forms, the data storage system 148 can include one or more removable data storage units.

The main body module 104 also houses various interface subsystems including a user interface subsystem 150 that comprises a plurality of user actuatable controls for controlling the operation of the camera 100. In this example, the primary user interface is a touch screen, but the camera 100 may additionally include a plurality of buttons or other control devices to allow user control of the camera 100. Also provided is an input and/or output subsystem 152 which comprises one or more input and/or output ports for transferring data to and from external devices.

The main body module 104 additionally includes a thermal control subsystem 154. Thermal control subsystem 154 primarily includes a fan 156 which draws air through ventilation openings 158 and 160 in the housing 138 of the main body module 104. The thermal control subsystem 154 can also include one or more heat sinks, radiators or other heat conductive elements 162 for enhancing conductive heat transfer to the air passing through the ventilation system. The imaging sensor 118 is optimally operated at a stable temperature. Accordingly the thermal control subsystem 154 is maintained in thermal contact with the image capture module 102 and thus the imaging sensor 118 via a heat transmitting element such as heat pipe 164. Additionally, a heat dissipating element 162 can be connected to the external housing 138 of the main body module 104 such that the housing 138 itself can be used to dissipate heat to the camera's surrounds.

Figure 2C:
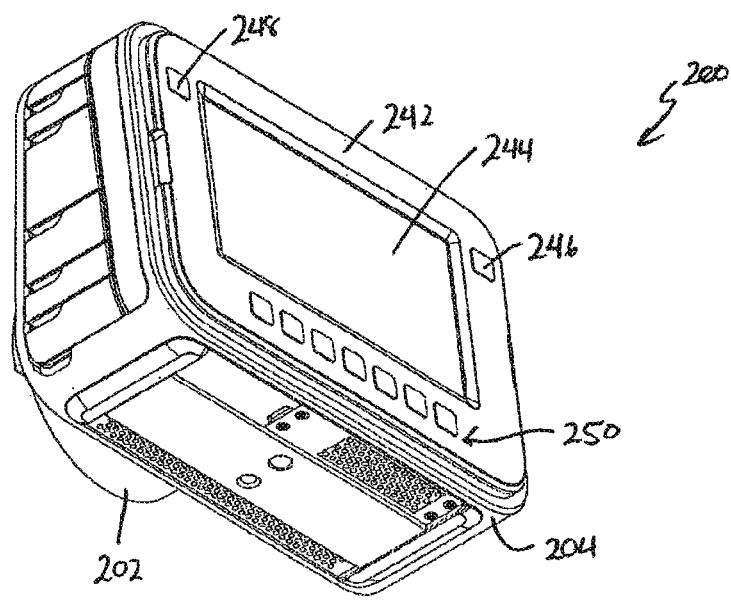
FIG. 2C shows a rear lower perspective view of the camera of FIG. 2A.

FIGS. 2A through 2C are line drawings showing various perspective views of a camera made with the general construction described in connection with FIG. 1. FIG. 2A shows a front perspective view from above a camera designated generally as reference numeral 200. The camera 200 includes an imaging module 202 and a main body module 204. As described in connection with FIG. 1, the image capture module 202, called herein the 'turret' due to its squat, generally cylindrical form, houses the camera's primary optical systems and imaging sensors. The turret 202 includes at its forward end a lens mount 206 including a mechanical structure configured to receive a mechanical coupling on a lens to be fitted to the mount 206. In one form the mechanical structure is arranged to receive a bayonet style mount. The lens mount 206 additionally includes a series of electrical and data contacts 208. A button 210 is also provided for disengaging a lens from the lens mount 206. In examples of this camera, the lens mount may be made according to a standard lens mount configuration such as an EF mount (such as shown in FIGS. 2A to 11); MFT mount embodiment illustrated in FIGS. 12 to 17; or other lens mount.

The turret 202 also includes a central bore 212 for admitting light to the optical system mounted therein. The inside wall of the bore 212 includes a series of ribs to prevent reflections of off axis unfocussed light from the inside surface 214 of the bore from reaching the image sensor. Also provided, but not visible in this view is an outer cover, in the form of an optical filter to seal the sensitive parts of the turret 202.

The main body 204 of the camera 200 is generally rectangular in front view and trapezoidal in profile. The turret 202 is mounted centrally on the front face 216 of the body 204. One side 218 of the body is provided a plurality of doors, e.g. door 220A, which may be opened to reveal user controls or input/output ports, power input ports, or the like. On the top 222 of the body 204 there is provided a pair of loops 224 to which a carry strap may be attached. The top face 222 also includes a series of recesses 226, which may be threaded bores or similar and which are adapted for receiving and mounting accessories to the camera body 204. The front face 216 additionally includes a user interface button 228. In this example the user interface button 228 is a "Record" button which actuates recording by the camera.

FIG. 2B shows an underneath front perspective view of the camera 200. In addition to those features already described in connection with FIG. 2A, one can see an access panel 230 on the side 232 of the body 204. The underside 234 of the body 204 additionally includes a pair of feet 236 on which the camera may he rested. There is also provided ventilation panels 238 which include a series of apertures through which air can pass to circulate through the inside of the body module 204. A mounting structure 240 is also provided. The mounting structure 240 includes a pair of bores for connecting the camera 200 to a standard tripod mount. Accordingly, one of the bores is threaded and the other is adapted for receiving a pin on a tripod mount.

FIG. 2C shows a rear perspective view of the camera 200, to illustrate additional user interface controls visible in this view. This rear view, shows the back side 242 of the body 204. Centrally located within the rear side 242 is a display screen 244. The display screen 244 can preferably be fitted with a touch sensor interface to enable the user to input data to the camera 200. The rear face 242 additionally includes buttons 246 and 248 and a row of buttons 250 to provide additional user controls.

In this example, each of the modules making up the camera, namely the turret 202 and body 204 include a main housing. The housing is machined from aluminum in this example, although alternatives, including but not limited to, cast magnesium or plastics could also be used. In the case of the turret 202, the housing is generally cylindrical in form, whereas the housing for the body module 204 has a generally rectangular exterior shape with rounded corners. These housings, the details of which will be described below, provide a mechanically rigid structure to which internal components can be mounted and also provide a rugged exterior surface. Additionally, the housing of the body 204 can additionally be used as a heat sink and heat dissipating device to aid transfer of waste heat from the camera to the environment.

Figure 3:
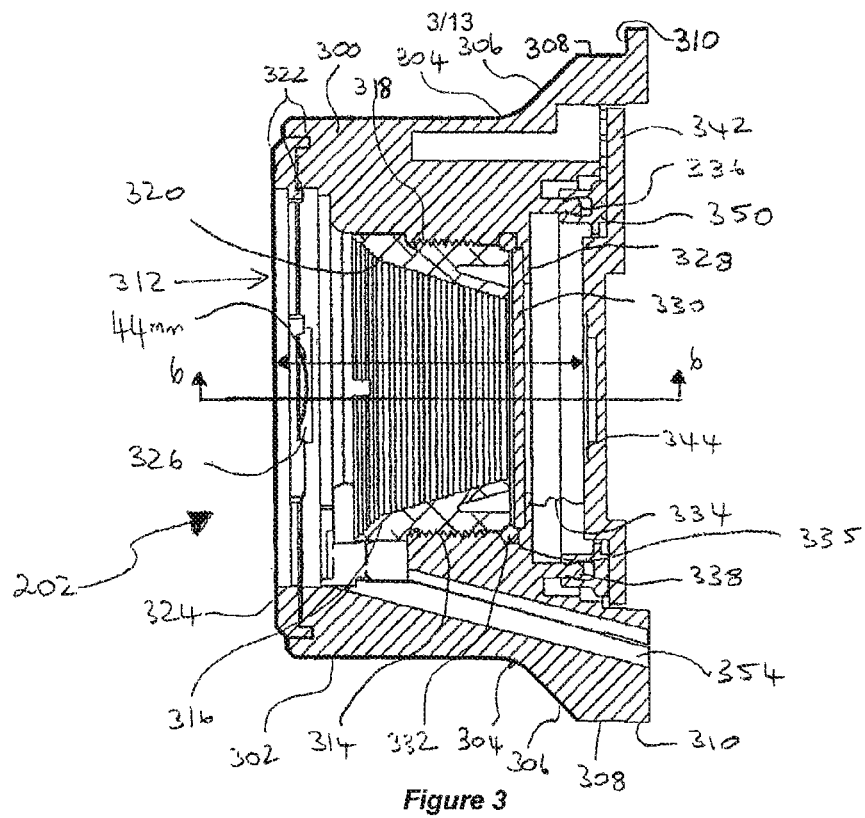
FIG. 3 is a cross-sectional view through an image capture module of the camera of FIG. 2A showing details of its construction.
Figure 4:
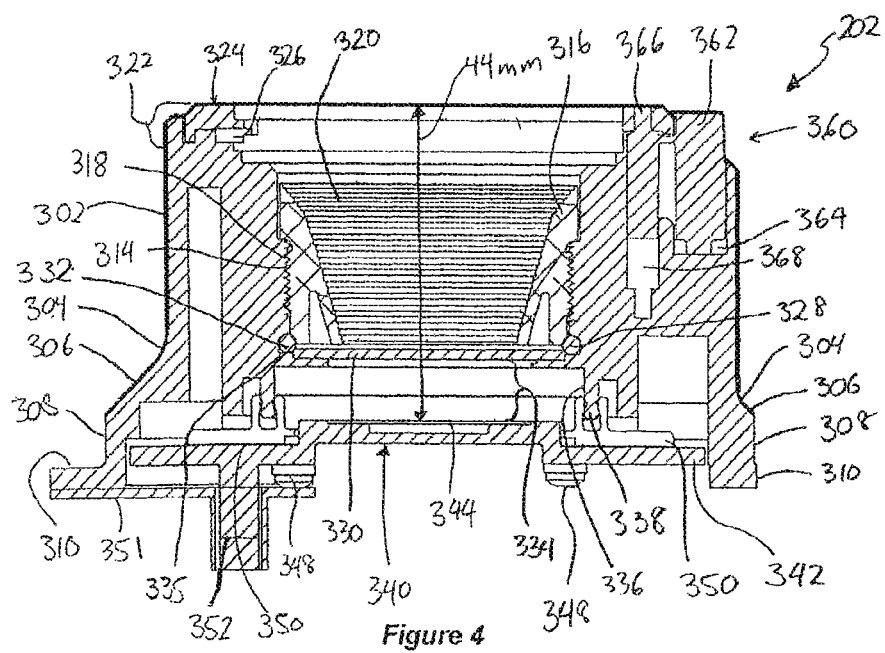
FIG. 4 is a horizontal cross-section through the image capture module illustrated in FIG. 5 taken along line 6-6.
Figure 5:
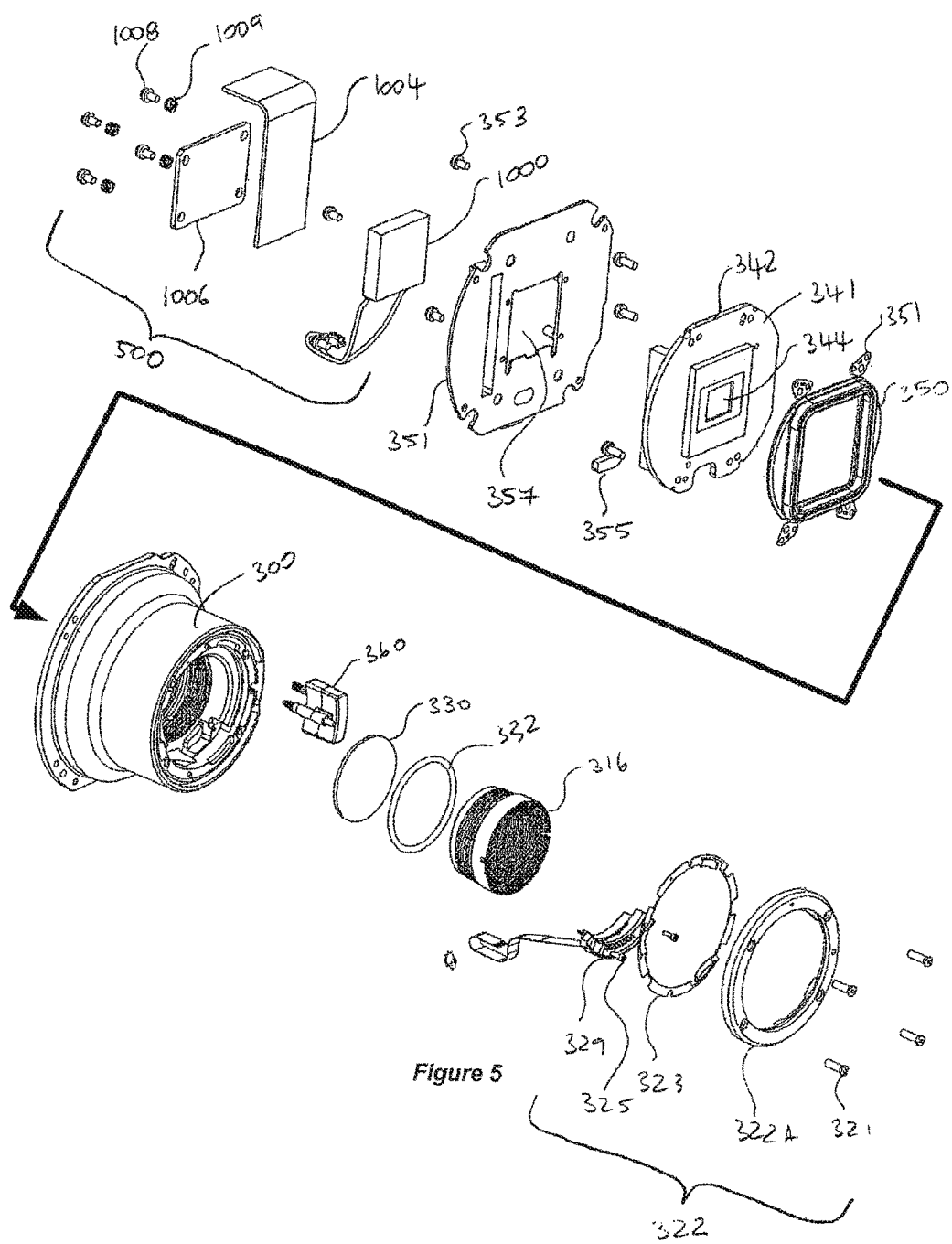
FIGS. 5 and 6 are front and rear exploded views of the image capture module of FIGS. 3 and 4.
Figure 6:
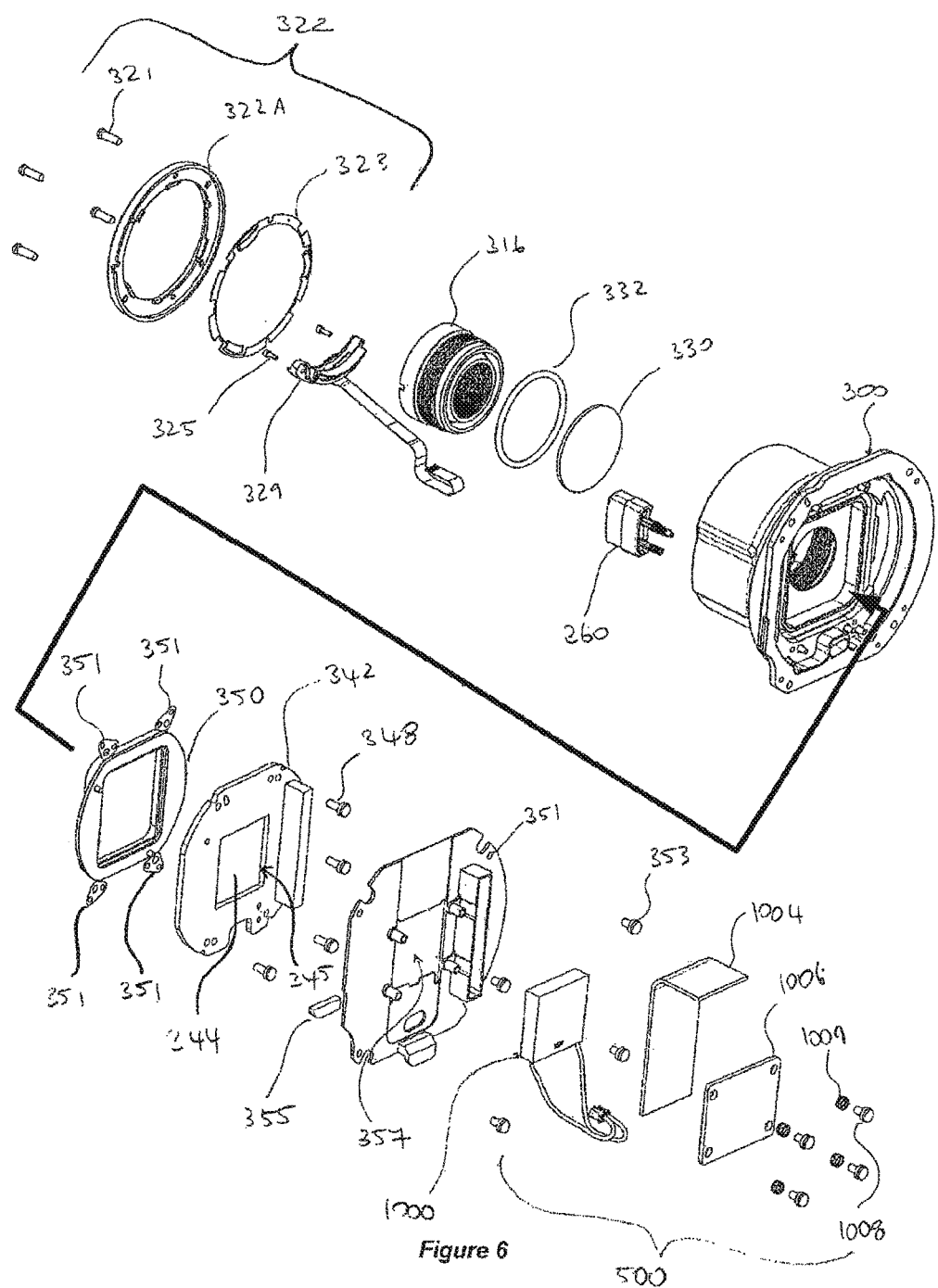

FIGS. 3 and 4 are cross-sectional views through the image capture module or turret 202 of the camera illustrated in FIGS. 2A to 2C; and FIGS. 5 and 6 are front and rear exploded views of the image capture module 202; FIG. 3 illustrates a vertical cross-section through the turret 202 and FIG. 4 is a horizontal cross-section at line 6-6 illustrated in FIG. 3, looking upward. FIGS. 3 to 6 will be described together using like numbering.

Turret 202 includes an external housing 300. The external housing is machined from aluminum, although alternative constructions, such as cast magnesium or plastic could also be used. The housing 300 includes a generally cylindrical forward portion 302 which merges via a radius 304 into a taper 306. The taper 306 transitions into another cylindrical portion 308 at its rear edge, and then the housing steps out into a short shoulder 310. The housing 300 has a central bore 312 which includes a series of steps such that it reduces in radius from its front to rear. Midway along the length of the bore 312 is a threaded section 314, thread is used to engage an insert 316 which has a generally cylindrical and threaded outer face 318 and a tapered inner face 320. The tapered inner face 320 includes a plurality of ridges or grooves to form an antireflective internal face leading to the image center of the camera.

At the front of the body 300 there is positioned a lens mount 322. The lens mount 322 has a forward facing mounting surface 324 which abuts against lenses which are fitted to it. The lens mount 322 also includes various mechanical details, e.g. 326 which are used to engage a bayonet fitting on a lens which is attached to the lens mount 322.

About three quarters of the way along the depth of bore 312 the bore steps inward at 328. The shoulder 328 supports an optical filter 330 which in use filters out non-visible wavelengths of light. The filter 330 is held in place by an O-ring seal 332, which is received in a groove 335 . The O-ring 332 is held in its groove and the filter 330 is held in place and sealed against the O-ring 332 by the threaded insert 316 being screwed into the bore 312. Following the filter 330 is an air gap 334. The air gap 334 has a stepped profile and opens outward from shoulder 328. The peripheral wall 336 of the air gap is defined by a rearwardly projecting flange 338.

At the most rearward end of the turret 202 is an image sensor assembly 340. The image sensor assembly 340 includes a substrate 342 which, in this example is a printed circuit board substrate, which carries an image sensing chip 344. The image sensor assembly 340 is mounted to the housing 300 via a series of screws 348. The screws are used to provide an adjustable mounting for the image sensor assembly 340 when mounting it to the turret housing 300. The mounting can additionally include one or more spacers such as shims of thin metal or the like which can be used to adjust the positioning of the sensor assembly 340 with respect to the housing 300. In particular, it is important that the imaging sensor 344 is correctly located with respect to the central axis of the aperture 312 and that its position in a forwards and backwards direction is set accurately with respect to the front mounting face 324 of the lens mount 322. In the case of an EF mount, the spacing between the mounting face 324 and the imaging plane is nominally 44 mm. This length may vary depending on the configuration of the optical system positioned between the lens mount and image sensor 344, as the inclusion of lenses may lengthen or shorten the distance. Moreover the intention to use a different lens mount or external lens system may dictate a different predetermined spacing. The manufacturing tolerance of the housing 300 and sensor assembly 340, may require the position of the sensor assembly 340 to be adjustable by a small fraction of a millimeter, say less than 0.2 mm. Although, better precision is desirable. In this case, the spacers used can be metal shims of a thickness around 0.025 mm. Although other sizes may be used.

Depending on the construction of the imaging sensor 344, the imaging plane of the sensor may not be the front surface of the imaging sensor. Instead, it may be set some distance back into the depth of the imaging sensor. In this case it will not be possible to use a mechanical method or jig to calibrate the mounting depth to the imaging plane of the sensor directly. Therefore it will either be necessary to determine the distance between the front mounting face 324 of the lens mount 322 and a point on the imaging sensor that lies at a known position with respect to the imaging sensor's imaging plane to infer the position of the imaging plane, or determine the position of the imaging plane by optical means, such as by performing back focus calibration, in which the image sensor position is adjusted such that a projected test image is correctly focused on the sensor.

For example due to the construction of the sensor, the die surface of the sensor, which defines the imaging plane of the sensor, may be located at certain depth of beneath the front face of the sensor, say 1 mm to 2 mm. This means that with the nominal focal length of 44 mm of an EF lens mount, the distance to the face of the imaging sensor from the lens mount surface needs to be reduced from 44 mm by this offset.

In order to provide a seal on the rear side of the imaging assembly, there is a seal 350 with a pair of upstanding sealing flanges defining a U-shaped channel between them. The innermost edge of the seal 350 surrounds the imaging sensor 344 and the upstanding flanges form a seal against the flanges 338 of the housing 300. This seal defines a sealed void between the rear-most wall of the filter 330 and the imaging sensor 344. This space is sealed against dirt, dust, moisture and other contaminants. The rear face of the imaging assembly 340 additionally includes as connector 352 which is configured to receive a multiconductor connector to read out data from the imaging sensor 344 to the data processing system located in the body 204. As can be seen best in FIG. 3, the housing 300 additionally includes an angled channel 354 which is arranged to receive a series of wires for connecting the electrical and data contacts of the lens mount 322 with the data processing system of the camera. As can be seen best in FIG. 4, the housing additionally includes a button arrangement 360 which forms part of the release mechanism for a lens attached to the lens mount 322. The button includes a spring loaded button member 362 which projects out of an aperture 364 in the housing 300 and is connected to a pin 366. The pin 366, when extended, engages with a compatible receiving hole in a lens attached to the lens mount 322 and prevents the lens from rotating with respect to the lens mount 322, to prevent unintended removal of the lens. The button 362 is arranged to slide within a complementarity shaped cavity 364 to guide it when the button 362 is pressed.

To better illustrate the construction of the image capture module 202, front and rear exploded views are provided as FIGS. 5 and 6 respectively. In addition to the components shown in FIGS. 3 and 4, this view also illustrates a cooling system that can be mounted thereto to transfer heat away from the imaging sensor. The components will be briefly described beginning at the front of the module 202, beginning with the lens mount 322.

The lens mount 322 comprises a mechanical mounting ring 322A that provides mechanical structure to which a lens is mounted. Spring 323 is used to retain the lens along with button assembly 360. Contact assembly 329 is used to make electrical and data connections with lenses. The contact assembly 329 is mounted to the housing 300 by screws 325. The mechanical mounting ring 322A is mounted to the housing 300 with screws 321.

The filter 330 is inserted into the housing 300 and sealed to it by O-ring 332. The O-ring is held in place by the insert 316.

Turning to the back side of the housing 300, there is first located the seal 350 which engages the inside of the housing 300 and the image sensor 344 mounted on the substrate 342.

The position of the sensor is adjustable during manufacture and calibration by placing one or more spacers, such as shims 351, between the housing 300 and the opposing face 341 of the substrate 342. The substrate 342 is held to the housing by screws 348. Element 355 is seal that covers the back of a microphone (not illustrated) that is mounted in the body housing. Next, a backing plate 351 is provided to provide a mechanical mount for the cooling system 500 components. The cooling system includes a Peltier cooler 1000 and a heat pipe 1004 mounted in thermal contact with the image sensor 344. The backing plate 351 has a hole 357 through it to enable the cooler 1000 to directly contact the image sensor 344. The heat pipe 1004 is retained against the hot side of the cooler 1000 by a mounting plate 1006 that is secured in place by screws 1008 and springs 1009.

Figure 7:
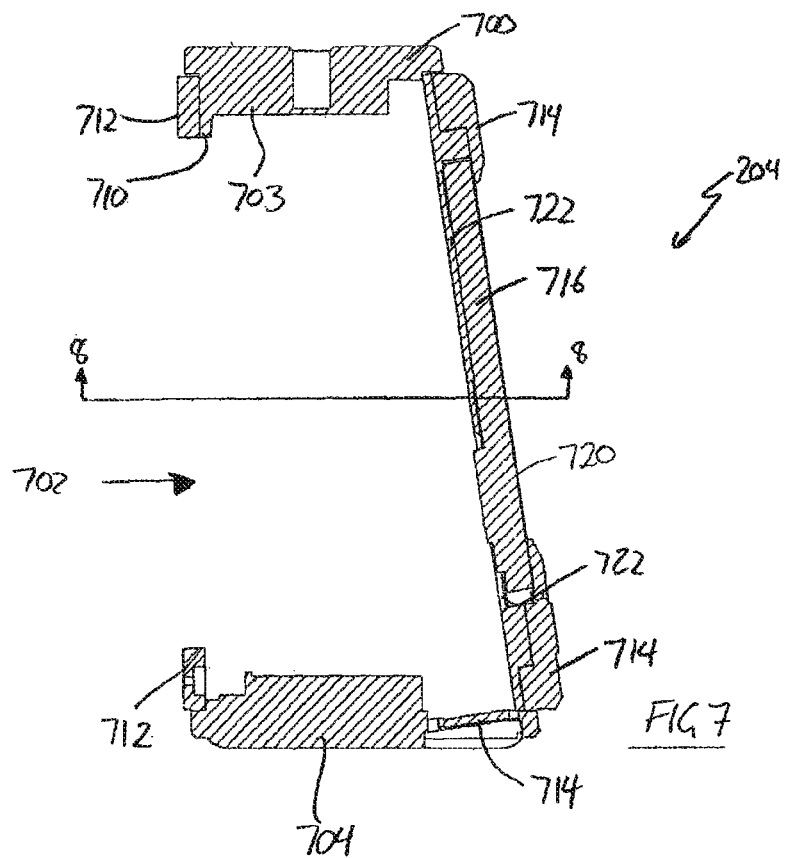
FIG. 7 is a cross-sectional view through a main body housing of the camera of FIG. 2A, taken along a vertical plane, which aligns with the plane of the cross-section through the image capture module illustrated in FIG. 3.
Figure 8:
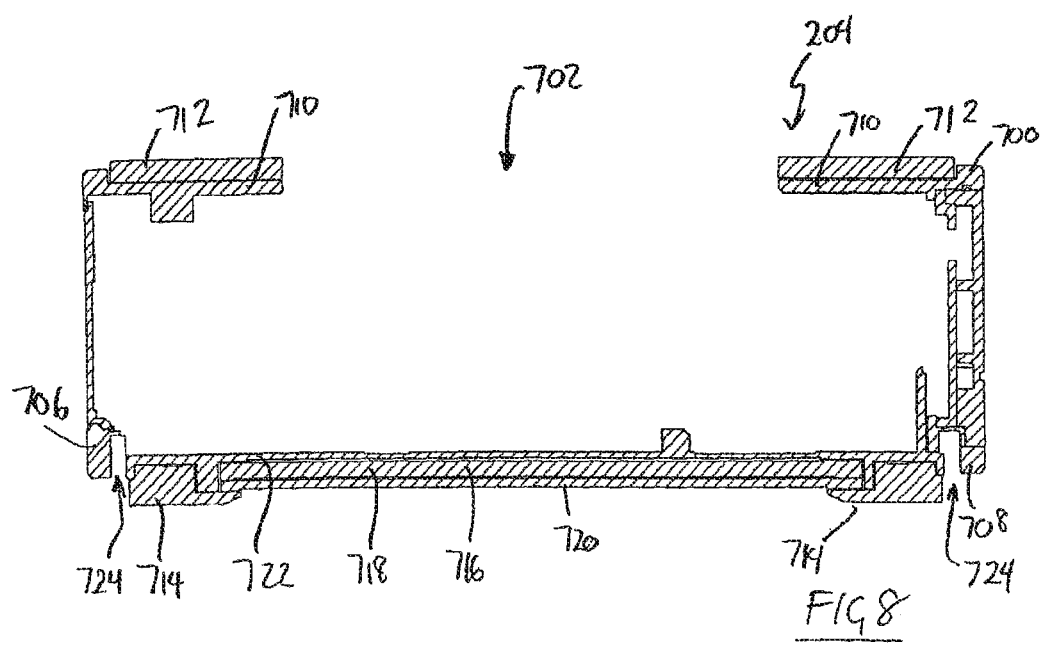
FIG. 8 is a horizontal cross-section through the main body housing illustrated in FIG. 7, along line 8-8.

FIGS. 7 and 8 show cross sectional views corresponding to the cross sectional views of the turret 202 shown in FIGS. 3 and 4, but instead show the body 204 of the camera 200. In side view the body 204 is generally trapezoidal in shape, whereas in horizontal cross section it is generally rectangular. The body module 204 includes a large circular recess 702, its front face, which in use, receives the turret 202. The main body forming the housing 700 of the body module 204 comprises a circumferential housing. The housing includes a top wall 703, a bottom wall 704, side walls 706 and 708 (which are not shown in great detail due to the position of this cross section and the provision of doors therein). The housing 700 additionally includes an integrally formed front wall 710, the front and rear surfaces of the housing 700 are provided with covers 712 and 714 respectively. The covers 712 and 714 have, buttons and other interface elements formed in them.

As can be seen best in FIG. 7, the bottom face of the housing 700 includes a panel 714 which is provided with ventilation therethrough. The rear face of the housing 700 includes a centrally mounted display screen 716 which includes a display 718 and touch sensitive interface 720. This is mounted on a mounting plate substrate 722 which is affixed to the housing 700 and closes the back of the housing 700. As can be seen in FIG. 8, each side of the housing 700 includes short blind recesses 724. These recesses are provided as mounting points for an external accessory such as a sun shade or the like.

Figure 9:
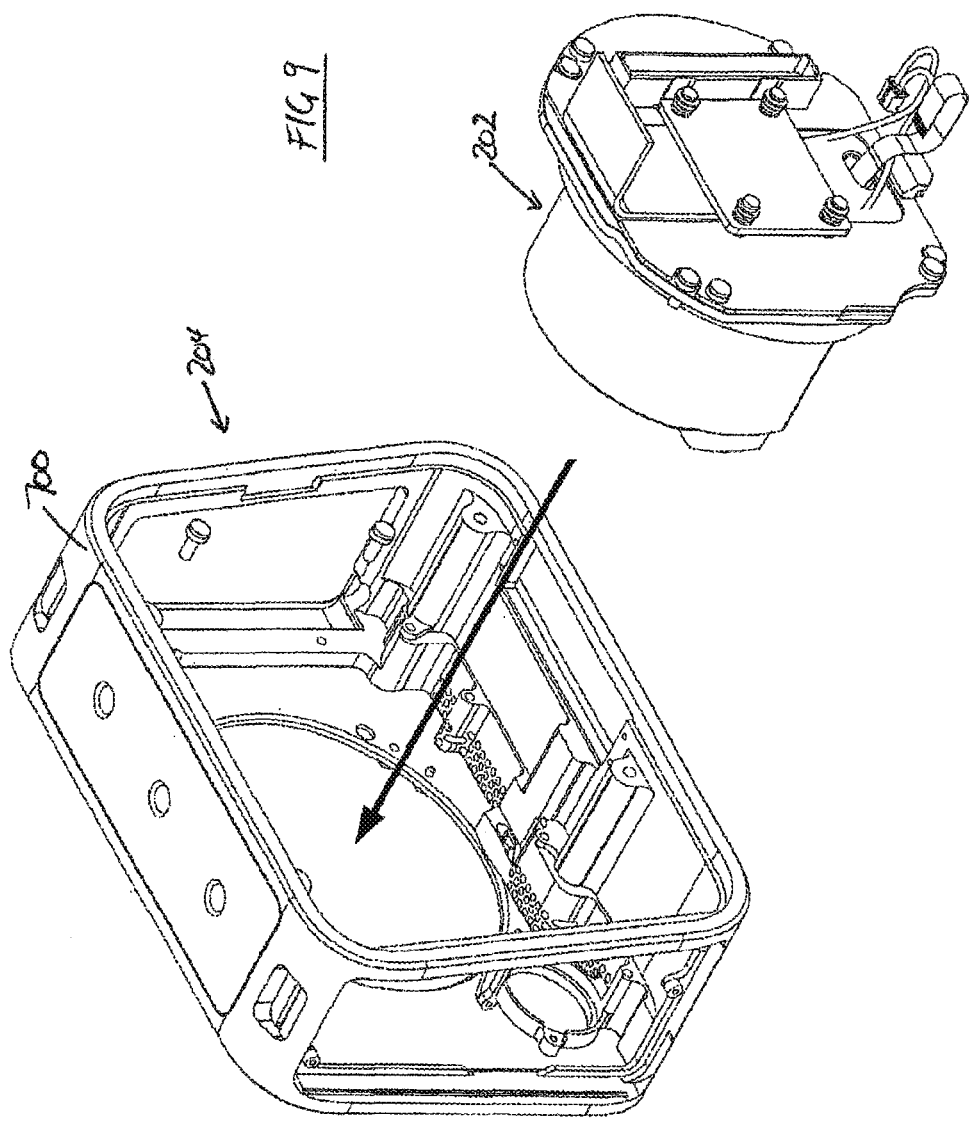
FIG. 9 illustrates an assembled image capture module of the type illustrated in FIGS. 3 and 4 being readied for insertion into a receiving aperture of the main body housing illustrated in FIGS. 7 and 8.

Turning now to FIG. 9, which shows a perspective view of the housing 700, which as mentioned before could he machined from a solid block of material such as aluminum; and turret assembly 202.

At this point it is worth noting that the turret assembly 202 is illustrated as being substantially complete, whereas the housing 700 of the body module 204 is relatively incomplete by comparison. This difference in stage of assembly between these two modules illustrates an important advantage of preferred embodiments of the present invention. Namely, that the turret can be manufactured entirely separately from the body module 204. This has various advantages compared to conventional camera manufacture, in which once the body is provided, all optical components need to be mounted separately within it and the camera built up around the body. Instead, the preferred embodiments of the present invention enables just the turret 202 to be assembled to its final form. The turret 202 can be calibrated and tested for correct operation prior to its being brought together with the other components of the camera.

In some forms, the turret 202 will be provided with memory (e.g. memory 120 in FIG. 1) for storing calibration data relating to the image sensor. The response of the image sensor 118 is imperfect at manufacture, resulting in pixels of the sensor having a different light conversion efficiency.

Therefore, the camera will need to be calibrated to account for this variation in performance. Calibration results in a creation of calibration data, e.g. for each pixel on the sensor. In image read out or processing this calibration data is used to correct the raw data from the sensor, so as to create consistent images.

Because the calibration data is unique to each sensor, and in preferred embodiments of the present invention associate the sensor with the image capture module, rather than a whole camera, it can be advantageous to store this data along with the chip in memory housed within the turret 202. This facilitates calibration of the turret separately to the fully assembled camera, and also enables replacement of the turret. Each time the camera is powered up, the main processor will read its own configuration from its own memory, then it will read the calibration information from the memory of the turret 202.

Moreover, because the imaging plane of the image sensor within the turret 202 is sealed after completion of manufacture of the turret 202, it no longer needs to be handled in the manner required during its manufacture. During its manufacture, ideally the turret would be in a clean room facility and manufactured under highly dust free and contaminant free environments. This is an expensive process and requires well trained technicians to perform it. By contrast, the body module 204 and the mounting of the turret 202 to the body module 204 can be performed in ordinary electronics manufacturing facilities. Whilst these are clean and relatively free of static and contaminants, they are not equivalent to the conditions of a clean room. Accordingly assembly in this type of environment is much cheaper than an equivalent assembly performed in clean room facility.

An additional benefit of separately manufacturing and assembling the image capture module 202 to the body module 204 is that the separate testing of the image capture module 202 can be performed. This prior testing reduces the likelihood of faulty products being produced or at least narrows down the mode of failure of the complete device to the body or its connection to the turret 202, because the turret assembly 202 has already been tested prior to its incorporation into the camera. Moreover, if the camera needs to be serviced or dismantled or even in the event of complete failure of the imaging system, this can be performed by removal of the turret 202 from the body module 204. The damaged or faulty turret 202 can be replaced by a functioning unit and reassembly of the remaining components performed. If the camera was made by conventional manufacturing techniques, the whole camera would need to be disassembled and reassembled in an environment which is fit for handling the sensitive optical components of the camera. Ideally this would mean clean room conditions, However, with a second hand camera which has been in the field, it is unlikely that that camera could ever be brought up to a condition of cleanliness that would allow its entry into a clean room for maintenance. Certain embodiments of the present invention mitigate this problem as only the turret needs to meet such stringent standards for cleanliness if it is to be worked on for maintenance purposes or refurbishment.

Returning now to FIG. 9 it can be seen, that the assembled image capture module 202 is inserted through the aperture 702, from behind, to mount the image capture module 202 to the housing 700 of the main body module 204. The assembly process used in this example includes integrating the pre-assembled image capture module into the housing of the main body 204 at an early stage of its assembly. The rest of the main body module 204 is then assembled around the image capture module 202 such that the image capture module 202 is integrated into the competed camera. Alternatively the pre-assembled image capture module 202 could be mounted to a pre-assembled main body module (or other module), In either case it is necessary to make the necessary electrical, data and/or thermal connections between the image capture module 202 and the other components of the camera. In this example the thermal connection is made by using the upper face 1005 of the heat pipe 1004 as a thermal interface for the image capture module 202, by bringing the thermal interface into contact with a component of the body module 204 so that heat is thus conducted out of the image capture module 202. In this case the heat is conducted to the body housing 700 of the body module 204.

Figure 10:
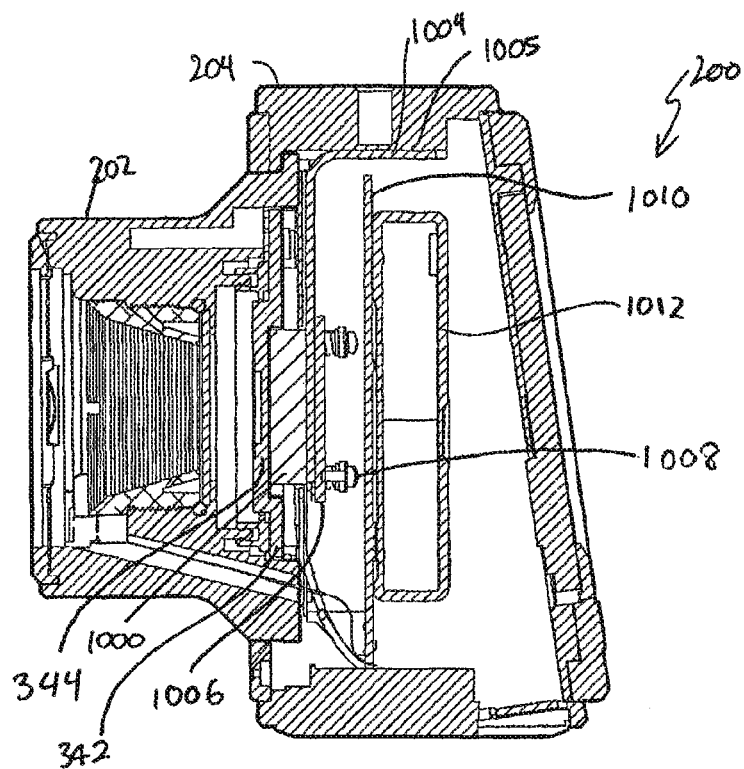
FIG. 10 is a vertical cross section through an assembled camera of the type illustrated in FIG. 2A, taken in the same plane as the cross-sections of FIGS. 3.
Figure 11:
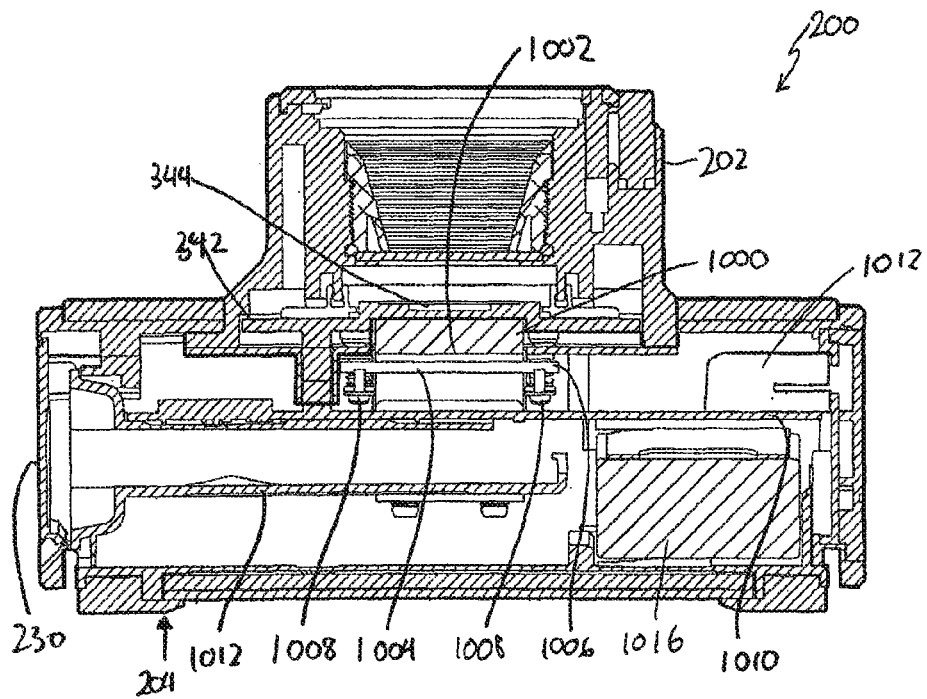
FIG. 11 is a horizontal cross-section through the camera illustrated in FIG. 10, taken along line 11-11.

FIGS. 10 and 11 show cross-sectional views through an assembled camera 200. The cross section of FIG. 10 is a vertical cross section corresponding to the sections shown in FIGS. 3 and 7. The horizontal cross section shown in FIG. 11 corresponds to the horizontal cross sections of FIGS. 4 and 8, For clarity, only components which have not previously been illustrated will be numbered in these figures so as not to clutter the diagrams for the reader.

As can be seen in FIGS. 10 and 11, the image capture assembly or turret 202 is mechanically mounted to the main body module 204.

As will be appreciated, the body module 204 carries additional components in a completed camera 200. A selection of these elements is illustrated for convenience. However, additional components will be present in other embodiments of the present invention. As will also be appreciated, the turret 202 will be electrically connected to the power supply mounted within the body 204, the image capturing system will also be connected to a data processing system within the body. As foreshadowed in relation to FIG. 1, thermal connection is also made between the image capture module 202 and the main body 204. In this embodiment the thermal connection is formed by the combination of a Peltier cooling device 1000 which is mounted to the rear face of the imaging sensor 344 through a hole 345 in the substrate 342. The Peltier cooler 1000 draws heat from its face mounted to the image sensor 344 to its rear face 1002. A heat pipe 1004 is mounted in physical contact with the face 1002 of the Peltier cooler 1000. The heat pipe 1004 is an inverted L shape and extends upward from the Peltier cooler 1000 and meets the top wall 703 of the housing 700. The heat pipe 1004 acts to transfer heat from the hot side 1002 of the Peltier cooler 1000 to the housing 700 via surface 1005 for dissipation to the environment. As discussed before, this heat dissipation function performed by the housing is enhanced by having a metal housing. The heat pipe 1004 is held in contact with the Peltier cooler by a mounting plate 1006 which is fastened in place by a pair of sprung screws 1008. The housing module 204 additionally houses the main circuit board 1010 which includes primary electronics and processing systems of the camera. Mounted behind circuit board 1010 is a generally rectangular bay 1012 which is configured to receive a removable memory device such as a solid state drive. The solid state drive is inserted and removed from the bay 1010 by opening the door 230 (previously illustrated in FIG. 3) which is mounted to the side of the housing 700. A series of connectors and other input/output ports are located at 1012 and accessed via door 1014. FIG. 11 additionally shows the position of the battery 1016 in this embodiment.

Figure 12:
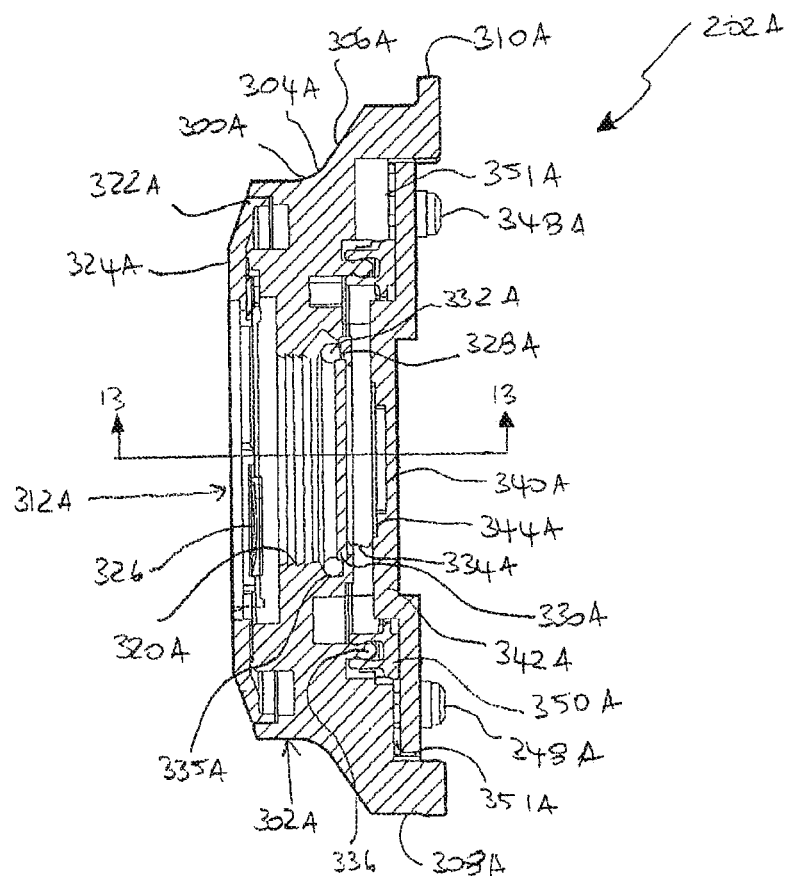
FIG. 12 is a cross-sectional view through another embodiment of an image capture module of a camera.
Figure 13:
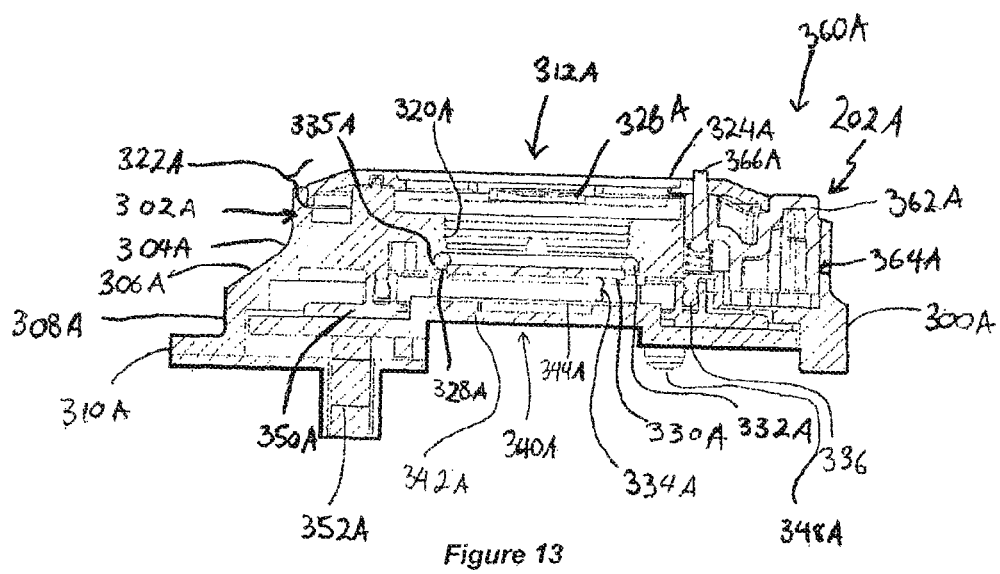
FIG. 13 is a horizontal cross-section through the image capture module illustrated in FIG. 12 taken along line 13-13.
Figure 14:
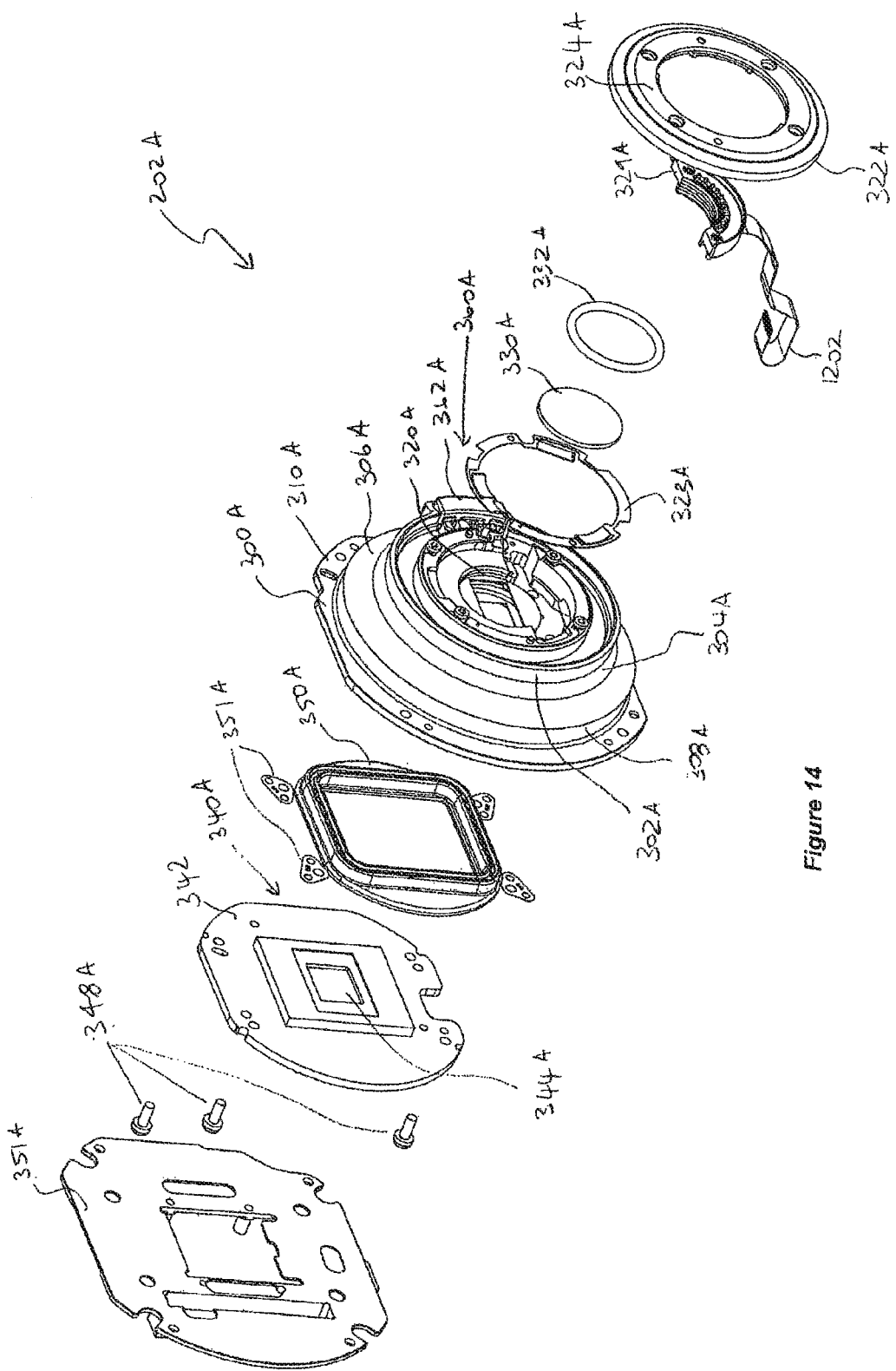
FIGS. 14 and 15 are front and rear exploded views of the image capture module of FIGS. 12 and 13.
Figure 15:
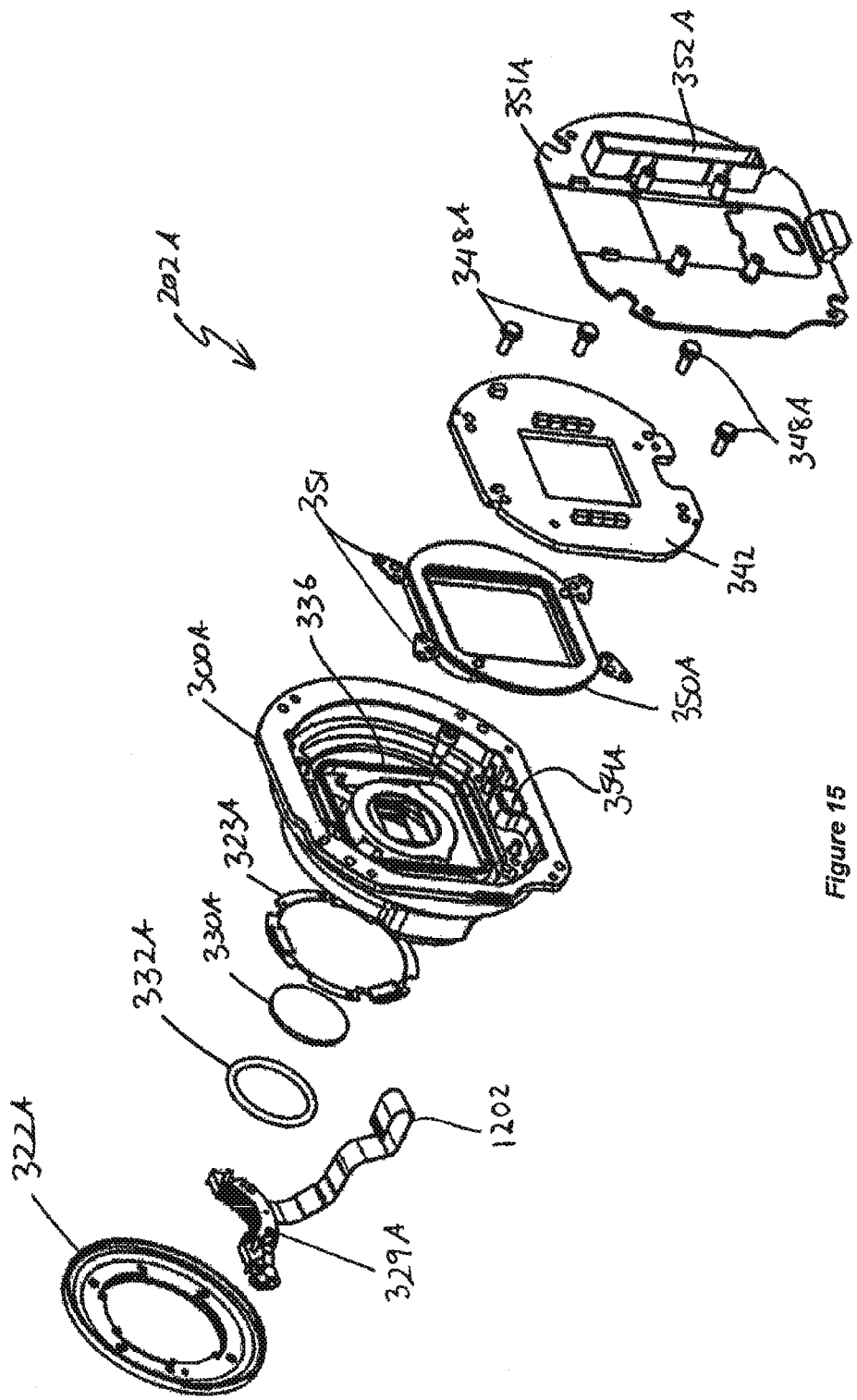

FIGS. 12 to 17 illustrate embodiments of a second image capture module and a camera made using this image capture module. In FIGS. 12 to 17 elements of the second embodiment that have corresponding elements in the embodiment of FIGS. 1 to 11 are labelled with reference numerals that are common except for the addition of an "A", and common components are like numbered, to aid understanding. FIGS. 12 and 13 are cross-sectional views through the image capture module or turret 202A; and FIGS. 14 and 15 are front and rear exploded views of the image capture module 202A.

FIG. 12 illustrates a vertical cross-section through the turret 202A and FIG. 13 is a horizontal cross-section at line 13-13 illustrated in FIG. 12, looking upward, FIGS. 12 to 15 will be described together using like numbering.

As will be appreciated on initial inspection the turret 202A is relatively short compared to the turret 202 of FIGS. 1 to 11. Turret 202A includes an external housing 300A. The external housing is machined from aluminum, although alternative constructions, such as cast magnesium or plastic could also be used. The housing 300A includes a short generally cylindrical forward portion 302A which merges via a radius 304A into a taper 306A. The taper 306A transitions into another cylindrical portion 308A at its rear edge, and then the housing steps out into a short flange 310A. The housing 300A has a central bore 312A which includes a series of steps such that it reduces in radius from its front to rear. The inner face 320A of the bore 312A includes a plurality of ridges or grooves to form an antireflective internal face leading to the image centre of the camera.

At the front of the body 300A there is positioned a lens mount 322A. The lens mount 322A has a forward facing mounting surface 324A which abuts against lenses which are fitted to it. The lens mount 322A also includes various mechanical details, e.g. 326A which are used to engage a bayonet fitting on a lens which is attached to the lens mount 322A.

Towards the rear end of the bore 312A a shoulder 328A is provided that supports an optical filter 330A which in use filters out non-visible wavelengths of light. In most embodiments this will be an infrared filter. The filter 330A is held in place by an O-ring seal 332A, which is received in a groove 335A. Following the filter 330A is an air gap 334A. The peripheral wall 336A of the air gap 334A is defined by a rearwardly projecting flange 338A.

At the most rearward end of the turret 202A is an image sensor assembly 340A. The image sensor assembly 340A includes a substrate 342A which, in this example is a printed circuit board substrate, which carries an image sensing chip 344A. The image sensor assembly 340A is mounted to the housing 300A via a series of screws 348A. The screws are used to provide an adjustable mounting for the image sensor assembly 340A when mounting it to the turret housing 300A. The mounting can additionally include one or more spacers such as shims 351A of thin metal or the like which can be used to adjust the positioning of the sensor assembly 340A with respect to the housing 300A. In particular, it is important that the imaging sensor 344A is correctly located with respect to the central axis of the aperture 312A and that its position in a forwards and backwards direction is set accurately with respect to the front mounting face 324A of the lens mount 322A.. In the present case, the turret 202A has a Micro Four Thirds mount (MFT mount) thus, the spacing between the mounting face 324A and the imaging plane is nominally 19.2 mm. This length may vary depending on the configuration of the optical system positioned between the lens mount and image sensor 344A, as the inclusion of lenses may lengthen or shorten the distance. The manufacturing tolerance of the housing 300A and sensor assembly 340A, may require the position of the sensor assembly 340A to be adjustable by a small fraction of a millimetre, say less than 0.2 mm. Although, better precision is desirable. In this case, the spacers used can be metal shims of a thickness around 0.025 mm. Although other sizes may be used.

In order to provide a seal on the rear side of the imaging assembly, there is a seal 350A with a pair of upstanding sealing flanges defining a U-shaped channel between them. The innermost edge of the seal 350A surrounds the imaging sensor 344A and the upstanding flanges form a seal against the flanges 338A of the housing 300A. This seal defines a sealed void between the rear-most wall of the filter 330A and the imaging sensor 344A. This space is sealed against dirt, dust, moisture and other contaminants. The rear face of the imaging assembly 340A additionally includes as connector 352A which is configured to receive a multiconductor connector to read out data from the imaging sensor 344A to the data processing system located in the body of a camera into which the turret 202A will be incorporated. As can be seen best in FIG. 15, the housing 300A additionally includes a channel 354A which is arranged to receive a series of wires 1202 for connecting the electrical and data contacts of the lens mount 322A with the data processing system of the camera. As can be seen best in FIG. 13, the housing additionally includes a button arrangement 360A which forms part of the release mechanism for a lens attached to the lens mount 322A. The button includes a spring loaded button member 362A which projects out of an aperture 364A in the housing 300A and is connected to a pin 366A. The pin 366A, when extended, engages with a compatible receiving hole in a lens attached to the lens mount 322 A and prevents the lens from rotating with respect to the lens mount 322 A, to prevent unintended removal of the lens. The button 362A is arranged to slide within a complementarily shaped cavity 364A to guide it when the button 362A is pressed.

To better illustrate the construction of the image capture module 202A, front and rear exploded views are provided as FIGS. 14 and 15 respectively. These views omit the cooling system illustrated in connection with FIGS. 5 and 6, but an identical cooling system can be mounted to this turret 202A to transfer heat away from the imaging sensor. Alternatively a cooling mechanism can form part of the body module 204A which is then thermally connected to the image sensor 344A In some embodiments, no active cooler may be necessary is sufficient heat dissipation can be achieved without it.

The lens mount 322A comprises a mechanical mounting ring 322AA that provides mechanical structure to which a lens is mounted. Spring 323A is used to retain the lens along with button assembly 360A. Contact assembly 329A is used to make electrical and data connections with lenses. The mechanical mounting ring 322AA is mounted to the housing 300A with screws (not shown).

The filter 330A is inserted into the housing 300A and sealed to it by O-ring 332A.

Turning to the back side of the housing 300A, there is first located the seal 350A which engages the inside of the housing 300A, specifically the flange 336, and the image sensor 344A mounted on the substrate 342A. The position of the sensor is adjustable during manufacture and calibration by placing one or more spacers, such as shims 351 A, between the housing 300A and the opposing face 341A of the substrate 342A. The substrate 342A is held to the housing by screws 348A. Next, a backing plate 351A is provided to provide a mechanical mount for the cooling system components.

Figure 16:
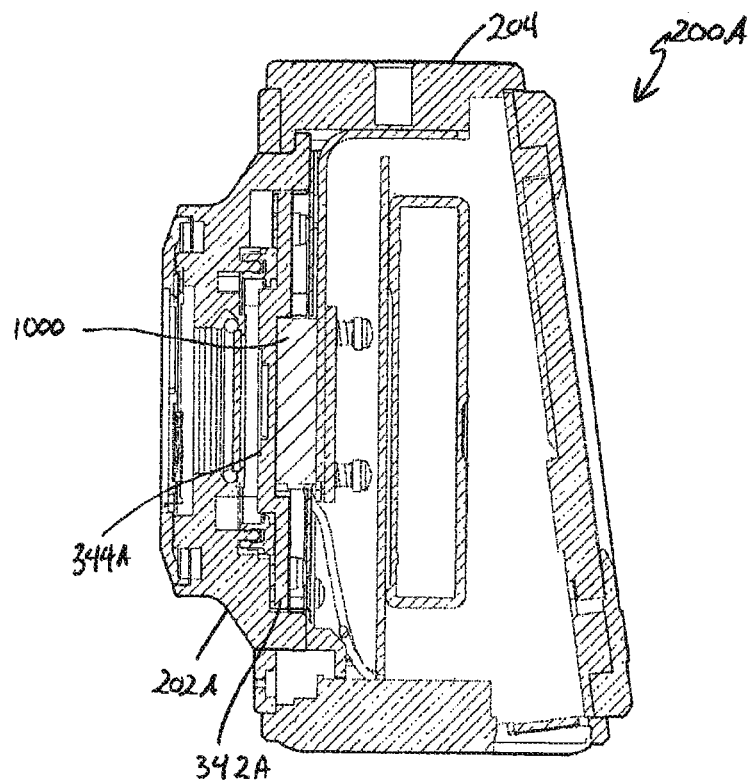
FIG. 16 is a vertical cross section through an assembled camera that includes an image capture module of the type illustrated in FIGS. 12 to 15, taken in the same plane as the cross-section of FIG. 12.
Figure 17:
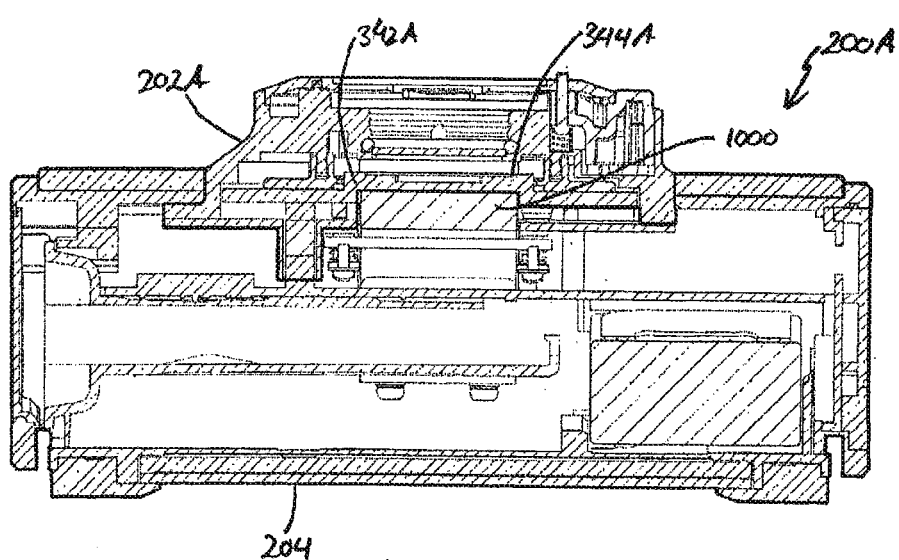
FIG. 17 is a horizontal cross-section through the camera illustrated in FIG. 16, taken along line 17-17.

FIGS. 16 and 17 show cross-sectional views through an assembled camera 200A. The cross section of FIG. 16 is a vertical cross section corresponding to the sections shown in FIG. 12. The horizontal cross section shown in FIG. 13 corresponds to the horizontal cross sections of FIGS. 13. For clarity, only components which have not previously been illustrated will be numbered in these figures so as not to clutter the diagrams for the reader. The camera body 204 is identical to the camera body illustrated in FIGS. 10 and 11 and need not be described in detail. The image capture assembly or turret 202A is mechanically mounted to the main body module 204 in the same manner as the previous embodiment.

The examples given herein include two modules one of which, is an image capture module. However, it will be appreciated that the camera can be formed from more than two modules. By way of example only a separate power supply module may be provided that interfaces with one or more other modules of the camera. In some embodiments a camera could include one or more second image capture modules. The second image capture modules may be identical to the first or different. The second image capture modules(s) could be mounted to a common body module with the first image capture modules. Such an arrangement may be used to capture images (video or still) from multiple viewpoints, and could find particular use in capturing images to enable the making of stereoscopic images, such as might be performed in making three dimensional video.

Figure 18:
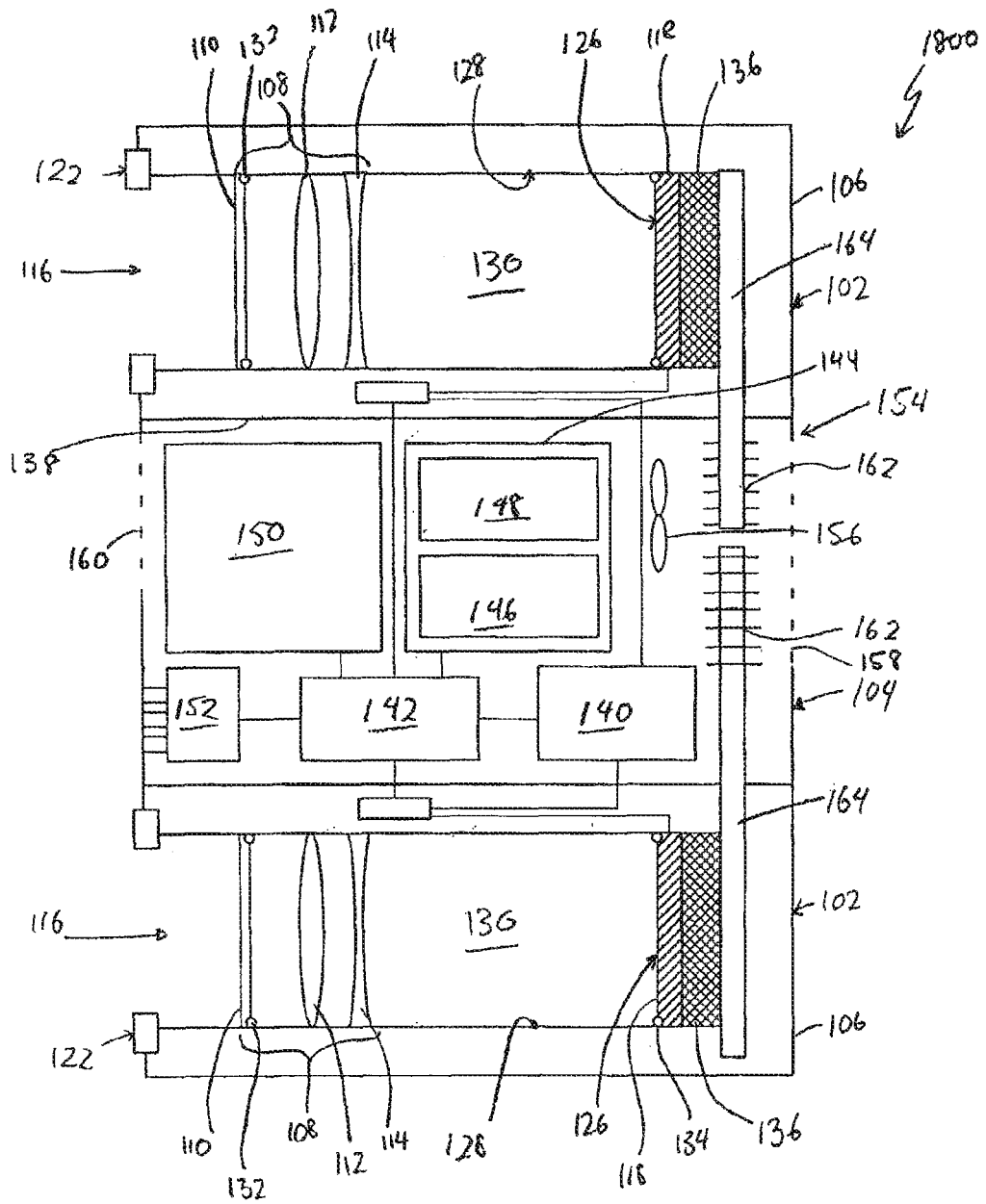
FIG. 18 is a schematic block diagram illustrating the main functional blocks of a camera having a second image capture module.

FIG. 18 is a schematic block diagram illustrating the main functional blocks of a camera having a second image capture module. The camera 1800 is formed from three primary modules, being two image capture modules 102 and a body module 104. The image capture modules 102 each form sealed optical and image capture systems which are configured to receive light and independently form an image in an their respective image capture sensors. The body module 104 houses the remaining functional subsystems of the camera 1800.

Turning firstly to the image capture modules 102, each of which are the same as the image capture module 102 described in connection with FIG. 1, and components have been numbered with the same reference numerals and will not be explained again. Generally speaking each image capture module 102 is formed from an image capture module housing 106 in which is mounted an optical system 108, imaging sensor 118 and supporting electronics systems.

The image capture modules 102 are mechanically connected to the main body module 104. There are also data, power and thermal connections between the image capture modules and the body module 104 (and possibly between the image capture modules in other embodiments). The mechanical mounting of the image capture modules with respect to each. other and the, body housing is done in such a way that a predetermined separation and alignment exists between the image capture modules 102. Most preferably the mounting is such that the optical systems of the image capture modules are relatively positioned and aligned such that the images captured by each can be combined to create a three dimensional video. The mounting mechanism may be adjustable to enable adjustment of the relative positioning.

As will also be appreciated stereoscopic images could also be captured using image capture modules with multiple image capture sensors or specialized optical systems.

As can be seen with the foregoing the cameras made in accordance with a preferred embodiment include an image capture module(s) that includes an image sensor and optical system mounted within the module's housing. The use of a separate module(s) of this type can enhance manufacturability, testing and maintenance of the camera, as the remainder of the camera e.g. one or more additional modules or components do not need to be manufactured to the same tolerance or in the same conditions as the image capture module.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A camera including:
    a body module and an image capture module;
    the image capture module, including:
        a housing containing:
            at least one image sensor to convert light into electrical signals;
            an optical system associated with the at least one image sensor and arranged to transmit light through the housing to the at least one image sensor; and
        a lens mount including a coupling to releasably engage an optical module to connect the optical module to the image capture module;
    the body module including:
        a body housing having ventilation openings to enable air to move through the body housing;
        a thermal control subsystem including a fan configured to move air through the ventilation openings in the body housing to dissipate heat generated in the image capture module; and
        a data storage subsystem to store data derived from an image sensor of the image capture module;
    said camera further including an active cooling system thermally coupled to the at least one image sensor and arranged to transfer heat away from the at least one image sensor and provide a thermal interface with the body module; and
    a heat pipe configured to transfer heat from the active cooling system to the body housing for dissipation by the body module.

2. The camera of claim 1 wherein at least one of the following additional subsystems is mounted within the body module:
    a power supply subsystem arranged to supply power to the image capture module;
    a data processing system to process image data received from an image sensor of the image capture module;
    a user interface subsystem to enable user control of the image capture module; or
    an input/and or output subsystem to enable data or electrical connection to another device.

3. The camera of claim 1 wherein the at least one image sensor has an imaging plane, and wherein the at least one image sensor is mounted within the image capture module such that the imaging plane lies at a predefined distance from a plane of a mounting face of the lens mount.

4. The camera of claim 3 wherein the at least one image sensor is mounted to the image capture module via an adjustable mounting structure to allow adjustment of the position of the at least one image sensor with respect to the housing of the image capture module and lens mount.

5. The camera of claim 1 wherein the optical system of the image capture module includes one or more light transmissive elements in front of and covering the at least one image sensor.

6. The camera of claim 5 wherein the one or more light transmissive elements includes a light transmissive element selected from a group including:
    one or more lenses;
    one or more filters;
    one or more polarisers; or
    a light transmissive cover.

7. The camera of claim 5 wherein the one or more light transmissive elements covering the at least one image sensor is spaced apart from the at least one image sensor and sealed to the housing of the image capture module.

8. The camera of claim 1 wherein the image capture module is a sealed image capture module and includes a rear seal sealing at least one of a substrate and/or the at least one image sensor to the housing of the image capture module.

9. The camera of claim 1 wherein the active cooling system coupled to the at least one image sensor arranged to transfer heat away from the at least one image sensor includes a Peltier cooler, and wherein the Peltier cooler is mounted to the image capture module in thermal contact with the at least one image sensor.

10. The camera of claim 9, wherein the Peltier cooler is in direct thermal contact with the at least one image sensor.

11. The camera of claim 9, wherein the Peltier cooler is in indirect thermal contact with the at least one image sensor.

12. The camera of claim 1 wherein the image capture module includes a generally tubular body with said lens mount located at one end thereof and a substrate carrying the at least one image sensor mounted adjacent to the other end thereof.

13. The camera of claim 12 wherein the metal body housing is thermally connected to the image capture module, either directly or via a heat transmitter such that heat generated in the image capture module is transmitted to the metal housing for dissipation.

14. The camera of claim 1 wherein a thermal interface of the image capture module is connected to the body module to transmit heat generated in the image capture module for dissipation by the body module.

15. The camera of claim 1 wherein the body housing is metal.

16. The camera of claim 1 wherein the housing of the image capture module forms part of the external housing of the camera.

17. The camera of claim 1, wherein the thermal control subsystem includes a radiator to dissipate heat generated in the image capture module.

18. The camera of claim 1, where the thermal control subsystem includes a heat sink to dissipate heat generated in the image capture module.

19. A camera including:
    a body module and an image capture module;
    the image capture module including:
        a housing containing:
            at least one image sensor to convert light into electrical signals;
            an optical system including one or more light transmissive elements covering the at least one image sensor and configured to transmit light through the housing to the at least one image sensor; and a lens mount including a coupling to releasably engage an optical module to connect the optical module to the image capture module;

the body module including:
- a body housing having ventilation openings to enable air to move through the body housing;
- a thermal control subsystem including a heat pipe in thermal contact with the image capture module, the thermal control subsystem further including a fan arranged to cause movement of air through the body housing to dissipate heat generated in the image capture module;
- a user-interface subsystem including a touch-sensitive screen for controlling the operation of the camera; and
- an input and/or output subsystem including one or more input and/or output ports for transferring data to and from the data storage subsystem;

said camera including an active cooling system including a Peltier cooler arranged to transfer heat from the at least one image sensor to the body housing via the heat pipe for dissipation by the body module.

20. A camera including:

a body module and an image capture module;

the image capture module, including:
- a housing containing: at least one image sensor to convert light into electrical signals;
- an optical system associated with the at least one image sensor and arranged to transmit light through the housing to the at least one image sensor; and
- a lens mount including a coupling to releasably engage an optical module to connect the optical module to the image capture module;

the body module including:
- a body housing having ventilation openings to enable air to move through the body housing;
- a thermal control subsystem including a heat pipe in thermal contact with the image capture module, and a fan configured to move air through the ventilation openings in the body housing to dissipate heat generated in the image capture module; and
- a data storage subsystem to store data derived from an image sensor of the image capture module;

said camera further including a Peltier device thermally connected between the at least one image sensor and the heat pipe and configured to control the temperature of the at least one image sensor.

21. A method of varying a temperature of at least one image sensor of a camera, wherein the camera includes:

a body module and an image capture module;

the image capture module, including:
- a housing containing: the least one image sensor to convert light into electrical signals;
- an optical system associated with the at least one image sensor and arranged to transmit light through the housing to the at least one image sensor; and
- a lens mount including a coupling to releasably engage an optical module to connect the optical module to the image capture module;

the body module including:
- a body housing having ventilation openings to enable air to move through the body housing;
- a thermal control subsystem including a heat pipe in thermal contact with the image capture module, the thermal control subsystem further including a fan configured to move air through the ventilation openings in the body housing to dissipate heat generated in the image capture module; and
- a data storage subsystem to store data derived from an image sensor of the image capture module;

wherein the method includes:
- providing a Peltier device in thermal contact with the at least one image sensor; and
- controlling the temperature of the at least one image sensor using said Peltier device by at least transferring heat to the body housing via the heat pipe.

22. A method as claimed in claim 21 wherein controlling the temperature of the at least one image sensor using said Peltier device, includes: varying the operation of the Peltier device to operate the at least one image sensor at a stable temperature.

* * * * *